United States Patent
Ninoyu et al.

(10) Patent No.: US 9,233,668 B2
(45) Date of Patent: Jan. 12, 2016

(54) VEHICLE BRAKING CONTROL DEVICE

(71) Applicant: ADVICS CO., LTD., Kariya (JP)

(72) Inventors: Masaki Ninoyu, Obu (JP); Masayuki Naito, Nagakute (JP); Yasuhiro Koike, Miyoshi (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 173 days.

(21) Appl. No.: 14/008,202

(22) PCT Filed: Sep. 26, 2012

(86) PCT No.: PCT/JP2012/074736
§ 371 (c)(1),
(2) Date: Sep. 27, 2013

(87) PCT Pub. No.: WO2013/047598
PCT Pub. Date: Apr. 4, 2013

(65) Prior Publication Data
US 2014/0054955 A1    Feb. 27, 2014

(30) Foreign Application Priority Data
Sep. 27, 2011   (JP) ................................. 2011-210642

(51) Int. Cl.
*B60T 8/64* (2006.01)
*B60T 8/17* (2006.01)
(Continued)

(52) U.S. Cl.
CPC . *B60T 8/17* (2013.01); *B60T 8/442* (2013.01); *B60T 8/4872* (2013.01); *B60T 13/161* (2013.01); *B60T 13/586* (2013.01); *B60T 13/686* (2013.01); *B60T 2270/604* (2013.01)

(58) Field of Classification Search
CPC ....... B60T 7/042; B60T 8/4872; B60T 8/442; B60T 13/686; B60T 13/165
See application file for complete search history.

(56) References Cited

U.S. PATENT DOCUMENTS 7,136,737 B2 * 11/2006 Ashizawa et al. ................ 701/70
7,234,786 B2 *  6/2007 Mori ..................... B60T 8/4872
                                                      303/11

(Continued)

FOREIGN PATENT DOCUMENTS

JP    2006-021745 A      1/2006
JP    2006-21745 A *     1/2006 ................ B60T 8/17

(Continued)

OTHER PUBLICATIONS

International Search Report (PCT/ISA/210) mailed on Dec. 25, 2012, by the Japanese Patent Office as the International Searching Authority for International Application No. PCT/JP2012/074736.

(Continued)

*Primary Examiner* — Thomas Irvin
(74) *Attorney, Agent, or Firm* — Buchanan Ingersoll & Rooney PC

(57) ABSTRACT

Taking a stroke within a period from when an operation of a brake operating member is started to when a predetermined stroke operation is performed as an ineffective stroke in which the master cylinder pressure is not generated, a control means controls an amount of differential pressure formed by a differential control valve such that a hydraulic braking force that corresponds to a stroke of the brake operating member is generated during the ineffective stroke, and even after the stroke of the brake operating member exceeds the ineffective stroke, increases the wheel cylinder pressure by performing raising of the amount of differential pressure formed by the differential pressure control valve by a predetermined raising amount with respect to the amount of differential pressure during the ineffective stroke.

8 Claims, 12 Drawing Sheets

(51) Int. Cl.
*B60T 8/48* (2006.01)
*B60T 13/68* (2006.01)
*B60T 13/16* (2006.01)
*B60T 13/58* (2006.01)
*B60T 8/44* (2006.01)

(56) References Cited

U.S. PATENT DOCUMENTS

| | | | | |
|---|---|---|---|---|
| 7,597,409 | B2* | 10/2009 | Kokubo et al. | 303/152 |
| 8,002,364 | B2* | 8/2011 | Kokubo et al. | 303/155 |
| 8,332,115 | B2* | 12/2012 | Kodama et al. | 701/70 |
| 8,746,813 | B2* | 6/2014 | Matsushita | B60L 7/18 303/152 |
| 8,919,893 | B2* | 12/2014 | Inoue | B60T 8/4081 303/122.04 |
| 8,998,351 | B2* | 4/2015 | Naito et al. | 303/116.1 |
| 2005/0264102 | A1* | 12/2005 | Tezuka | 303/152 |
| 2005/0269875 | A1 | 12/2005 | Maki et al. | |
| 2007/0228812 | A1 | 10/2007 | Kokubo et al. | |
| 2007/0228821 | A1* | 10/2007 | Maki et al. | 303/151 |
| 2007/0267915 | A1* | 11/2007 | Shimada et al. | 303/122 |
| 2007/0272457 | A1* | 11/2007 | Kodama et al. | 180/65.3 |
| 2007/0273204 | A1* | 11/2007 | Kodama et al. | 303/146 |
| 2008/0255732 | A1* | 10/2008 | Yasui et al. | 701/48 |
| 2010/0222978 | A1 | 9/2010 | Kodama et al. | |
| 2010/0270854 | A1* | 10/2010 | Okano et al. | 303/3 |
| 2013/0162012 | A1* | 6/2013 | Ishida | 303/11 |

FOREIGN PATENT DOCUMENTS

| | | |
|---|---|---|
| JP | 2007-276683 A | 10/2007 |
| JP | 2007-276684 A | 10/2007 |
| JP | 2009-179265 A | 8/2009 |
| JP | 2009-208600 A | 9/2009 |
| JP | 2010-000920 A | 1/2010 |

OTHER PUBLICATIONS

Written Opinion (PCT/ISA/237) mailed on Dec. 25, 2012, by the Japanese Patent Office as the International Searching Authority for International Application No. PCT/JP2012/074736.

* cited by examiner

FIG.3

UNTIL PORT 13f REACHES CUP SEAL 13g, BRAKE FLUID IS SUPPLIED FROM MASTER RESERVOIR 13e THROUGH MASTER CYLINDER CHAMBER. (M/C PRESSURE IS 0 EVEN IF PEDAL IS DEPRESSED)

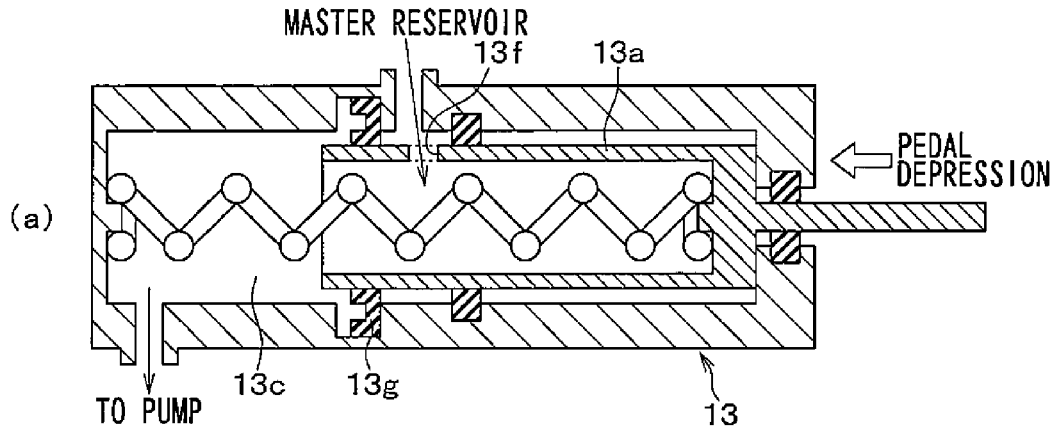

(a)

WHEN PORT 13f REACHES CUP SEAL 13g, MASTER RESERVOIR 13e IS DISCONNECTED FROM MASTER CYLINDER CHAMBER.

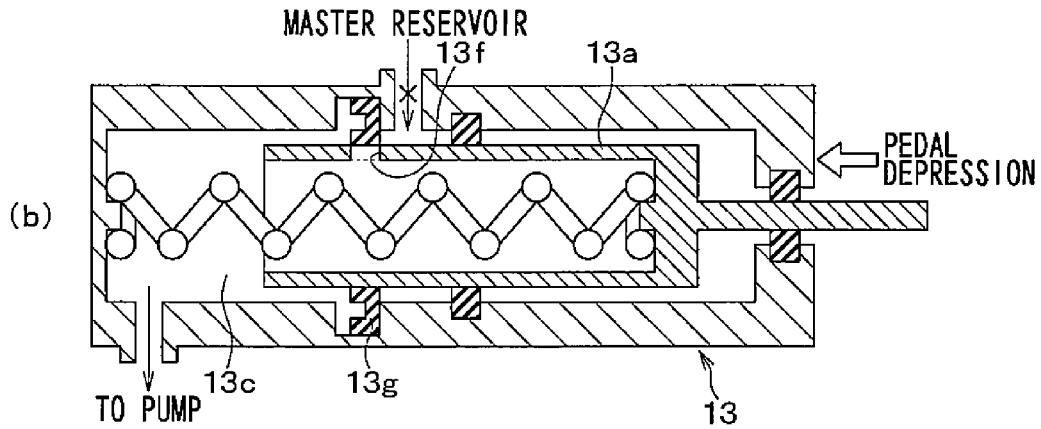

(b)

AFTER CUP SEAL 13g IS REACHED, BRAKE FLUID IN MASTER CYLINDER CHAMBER IS SUPPLIED. (M/C PRESSURE IS GENERATED BY DEPRESSION OF BRAKE PEDAL 11)

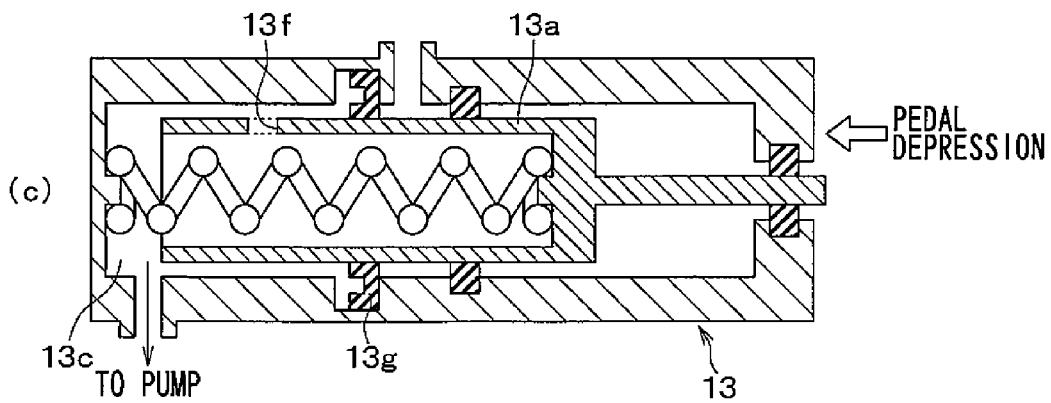

(c)

FIG.11
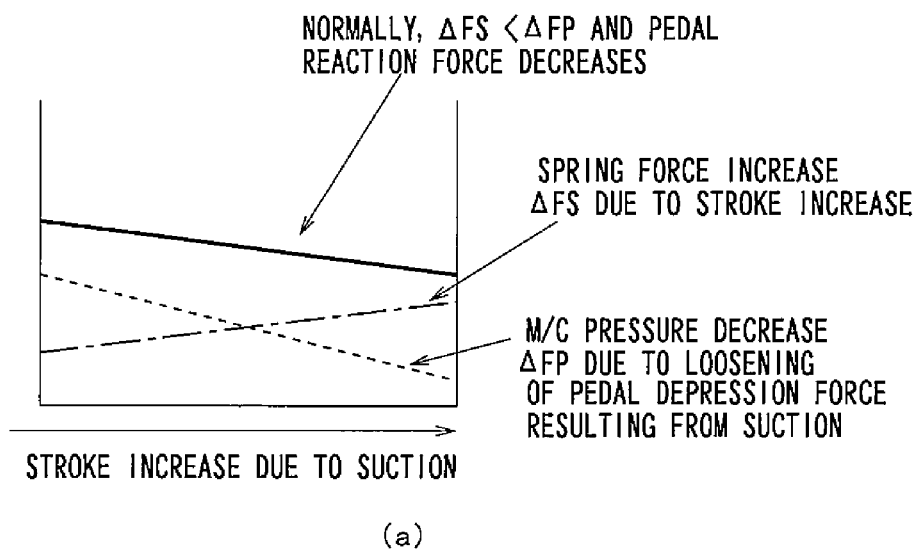
(a)
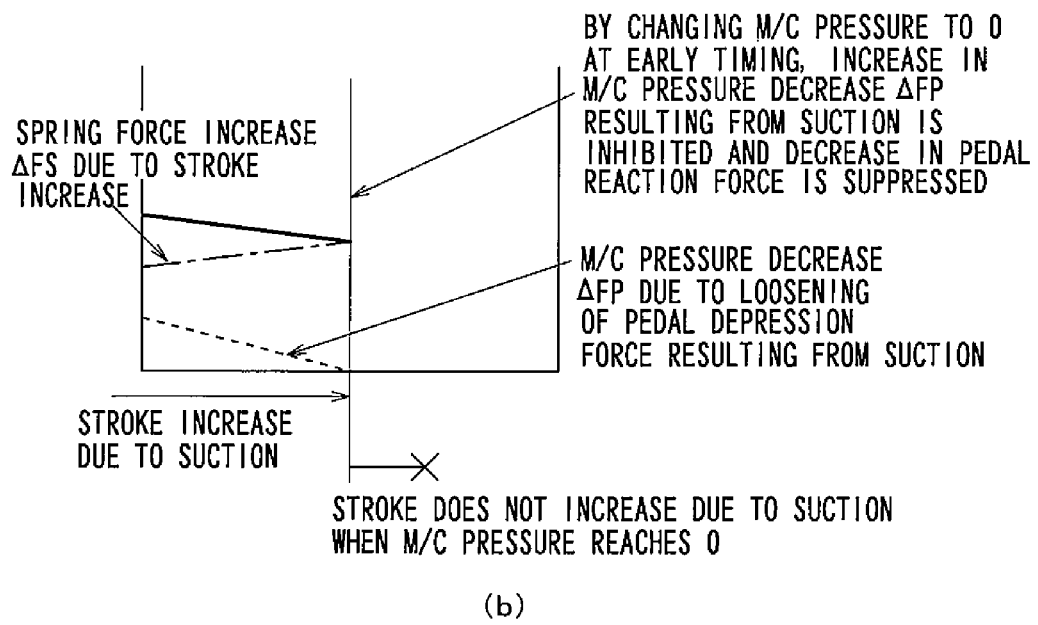
(b)

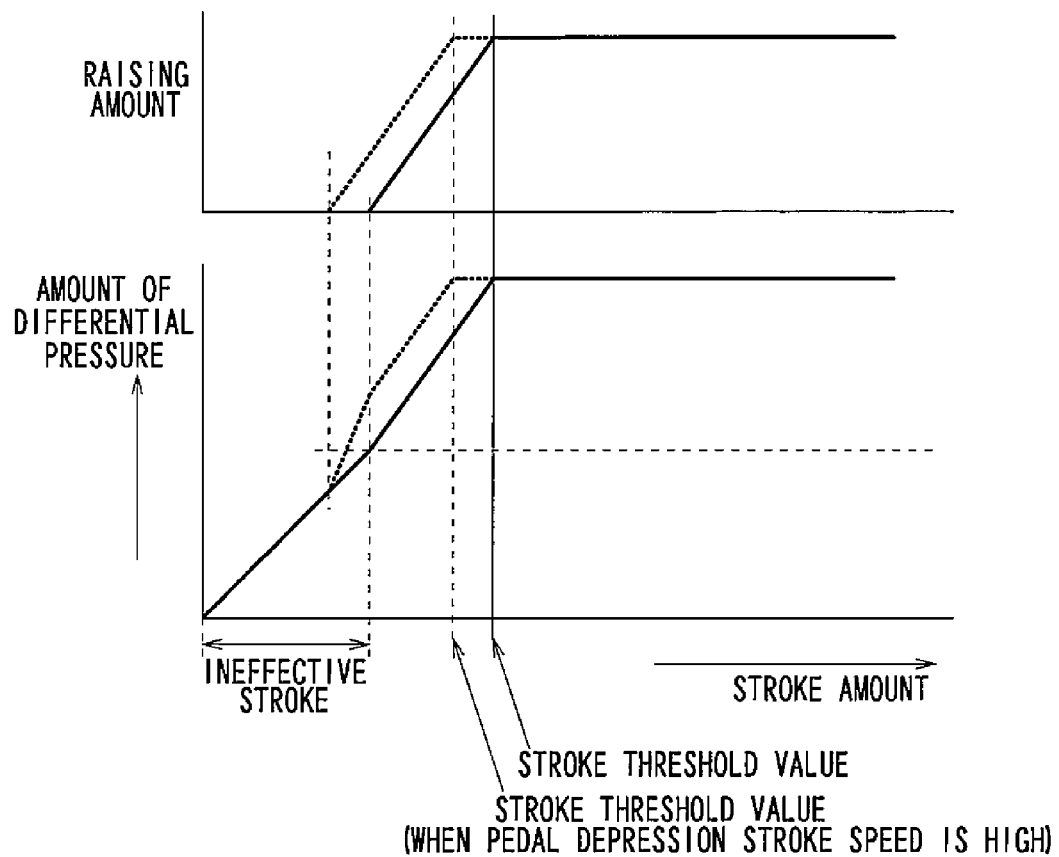

FIG. 13

FLUID VOLUME CORRESPONDING TO STROKE OF BRAKE PEDAL
≤ FLUID VOLUME SUCKED OUT BY PUMP
UNTIL PORT 13f REACHES CUP SEAL 13g, LACKING AMOUNT OF BRAKE FLUID
IS SUPPLIED FROM MASTER RESERVOIR 13e THROUGH MASTER CYLINDER.
(M/C PRESSURE IS 0 EVEN IF PEDAL IS DEPRESSED)

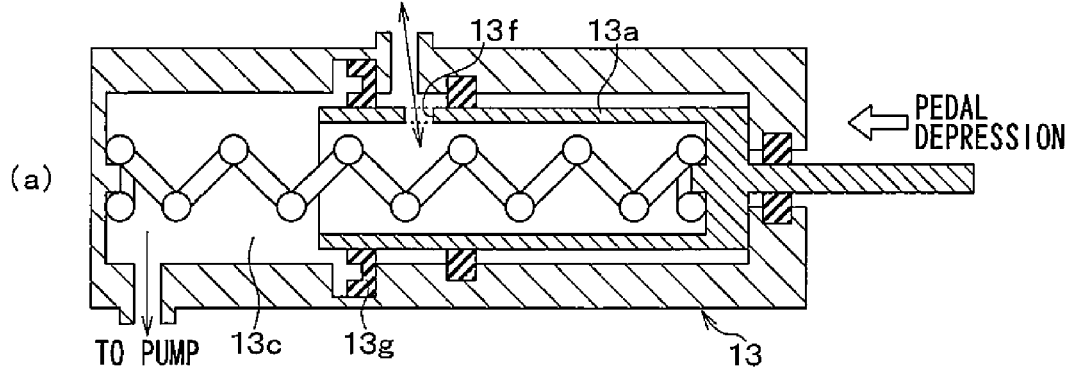

(a)

WHEN PORT 13f REACHES CUP SEAL 13g, MASTER RESERVOIR 13e IS
DISCONNECTED FROM MASTER CYLINDER CHAMBER. → M/C PRESSURE IS CHANGED
TO 0 BY SETTING RAISING AMOUNT SUCH THAT FLUID VOLUME CORRESPONDING
TO STROKE OF BRAKE PEDAL ≤ VOLUME SUCKED OUT BY PUMP.

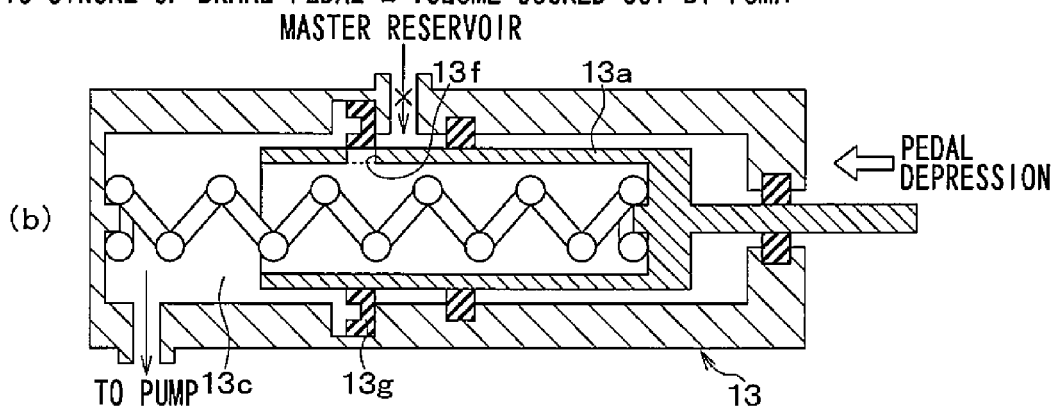

(b)

IF PEDAL DEPRESSION IS PERFORMED EARLY, IN A STAGE IN WHICH CLEARANCE
BETWEEN MASTER RESERVOIR 13e AND MASTER CYLINDER CHAMBER BECOMES
NARROW BEFORE MASTER RESERVOIR 13e IS DISCONNECTED FROM MASTER CYLINDER
CHAMBER, FLOW OF BRAKE FLUID FROM MASTER CYLINDER CHAMBER TO MASTER
RESERVOIR 13e IS HINDERED BY ORIFICE EFFECT.

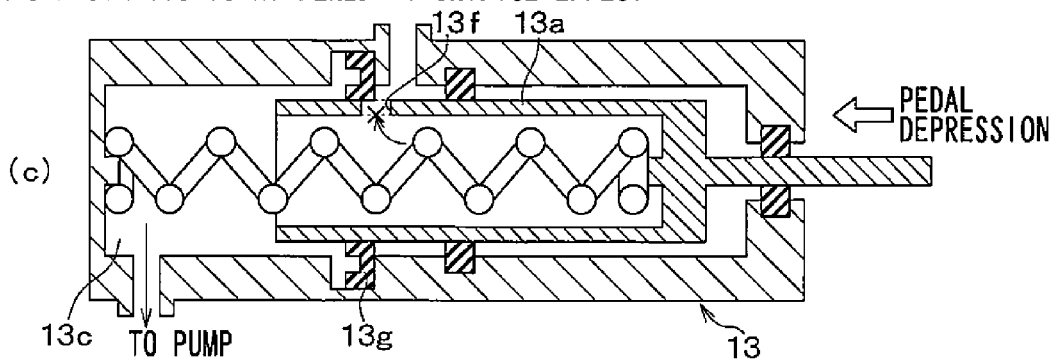

(c)

VEHICLE BRAKING CONTROL DEVICE

TECHNICAL FIELD

The present invention relates to a vehicle braking control device which causes a master cylinder (hereinafter referred to as an M/C) to generate an M/C pressure in accordance with depression of a brake pedal, and which controls a brake fluid pressure in a hydraulic brake device by pressurizing a wheel cylinder (hereinafter referred to as a W/C) based on the M/C pressure.

BACKGROUND ART

In related art, a brake mechanism is known which combines the M/C pressure generated by depressing a brake pedal and the brake pressure applied by brake fluid pressure increasing means for sucking out brake fluid from the M/C and pressurizing the brake fluid, and which supplies the combined pressures to the W/C, thereby performing pressurization such that the W/C pressure is higher than the M/C pressure (refer to Patent Literature 1, for example). This brake mechanism performs control such that, during an ineffective stroke from the beginning of the depression of the brake pedal to the closure of a port of a master reservoir provided in the M/C, the amount of pressurization is increased in accordance with a stroke amount, and after the port is closed, the W/C pressure is increased in accordance with an increase in the M/C pressure and the braking force is increased while the amount of pressurization is maintained.

CITATION LIST

Patent Literature

[PTL 1]
Japanese Patent Application Publication No. JP-A-2006-21745

SUMMARY OF INVENTION

Technical Problem

However, when the control is performed in the above-described manner, if the amount of pressurization by the brake fluid pressure increasing means is significantly increased while a driver maintains the depression of the brake pedal, the brake pedal is sucked to the M/C side by suction of the brake fluid from the M/C, or the M/C pressure is reduced by the suction of the brake fluid and a pedal reaction force is reduced. Thus, a problem of deterioration in a brake feeling occurs.

For example, in a vehicle braking control device which performs cooperative control of a regenerative brake device that generates a regenerative braking force using a hydraulic brake device and a motor generator, and which thereby controls a braking force to be generated for a vehicle, switching between the hydraulic braking force and the regenerative braking force is performed. When the vehicle speed is reduced and the regenerative braking force is reduced, in order to compensate for the reduced regenerative braking force, switching is performed such that the W/C pressure is increased and the hydraulic braking force is thereby increased. The above-described problem occurs in this type of case, for example.

In light of the foregoing, it is an object of the present invention to provide a vehicle braking control device that can suppress deterioration in a brake feeling that is caused by a decrease in a reaction force (a pedal reaction force, for example) to a brake operating member (a brake pedal, for example) when the brake operating member is sucked to an M/C side by suction of brake fluid from the M/C or when the M/C pressure is reduced by the suction of the brake fluid.

Solution to Problem

In order to achieve the above-described object, the invention described in a first aspect is characterized in that brake fluid pressure increasing means includes: a differential pressure control valve that forms a differential pressure between an M/C pressure and a W/C pressure; a pump that sucks out brake fluid in an M/C in a state in which the differential pressure is provided by the differential pressure control valve, and increases the W/C pressure by discharging the brake fluid toward a W/C; a motor that drives the pump; and control means for instructing the differential pressure that the differential pressure control valve forms. Taking a stroke within a period from when an operation of a brake operating member is started to when a predetermined stroke operation is performed as an ineffective stroke in which the M/C pressure is not generated, the control means controls an amount of differential pressure formed by the differential control valve by controlling the differential pressure control valve such that a hydraulic braking force that corresponds to a stroke of the brake operating member is generated during the ineffective stroke, and even after the stroke of the brake operating member exceeds the ineffective stroke, increases the W/C pressure by performing raising of the amount of differential pressure formed by the differential pressure control valve by a predetermined raising amount with respect to the amount of differential pressure during the ineffective stroke.

In this manner, when the depression of the brake operating member reaches an amount corresponding to the ineffective stroke, the amount of differential pressure of the differential pressure control valve is not held. Even after that, the amount of differential pressure of the differential pressure control valve is increased in accordance with the depression of the brake operating member, and the W/C pressure is raised by pump pressurization. By doing this, it is possible to reduce the M/C pressure by an amount corresponding to the raising by pump pressurization. It is thus possible to reduce the amount by which the brake operating member is sucked to the M/C 13 side, and it is also possible to reduce the amount of decrease in a reaction force to the brake operating member resulting from the decrease in the M/C pressure. It is thus possible to suppress deterioration in a brake feeling.

The invention described in second aspect is characterized in that, during a period in which the stroke of the brake operating member is smaller than a prescribed stroke threshold value after the stroke of the brake operating member has exceeded the ineffective stroke, the raising amount is increased as the stroke of the brake operating member becomes larger, and after the stroke of the brake operating member has exceeded the stroke threshold value, the raising amount is set to a constant reference raising amount.

In this manner, since an upper limit value of the raising amount is set to be the constant reference raising amount, it is possible to inhibit an excessively large raising amount from being set. In this case, when the M/C pressure is generated by the depression of the brake operating member, the hydraulic braking force that corresponds to the M/C pressure is also generated, and it is thus possible to generate a target braking force.

The invention described in a third aspect is characterized in that, when the stroke of the brake operating member is increased, the larger a change rate of the stroke becomes, the earlier a start timing of the raising becomes.

In this manner, when the change rate of the stroke of the brake operating member is larger than a stroke speed threshold value, the start timing of the raising is advanced so that the raising is started during the ineffective stroke. By doing this, it is possible to perform the raising before the M/C pressure is generated by an orifice effect due to a reduction in the opening area of a port of a master piston, and it is thus possible to prevent the M/C pressure from increasing. For example, as described in a fourth aspect, when the stroke of the brake operating member is increased, if the change rate of the stroke is larger than a predetermined stroke speed threshold value, the raising may be started during the ineffective stroke.

The invention described in a fifth aspect is characterized in that, using a regenerative brake device that performs electric power generation based on a rotational force of the wheel and generates a regenerative braking force by applying a resistance force that is based on electric power generation to the wheel, cooperative control of a hydraulic brake device and the regenerative brake device is performed such that a total braking force of the hydraulic braking force and the regenerative braking force is equal to a target braking force that corresponds to the stroke of the brake operating member. When, during braking, the regenerative braking force generated by the regenerative brake device is switched to the hydraulic braking force generated by the hydraulic brake device, the raising amount that is set before the switching is held.

In this manner, when the braking force is switched from the regenerative braking force to the hydraulic braking force, although the amount of differential pressure to be generated by the differential pressure control valve is increased, the raising amount is held constant. If, for example, the raising amount is increased in accordance with the stroke amount of the brake operating member, the amount of the brake fluid in the M/C decreases earlier and a speed at which the brake operating member is sucked in becomes higher. Therefore, the raising amount is held constant so that the speed at which the brake operating member is sucked in is inhibited from becoming higher. Thus, it is possible to further suppress the deterioration in the brake feeling.

Note that the reference numeral in brackets of each means described above shows a corresponding relationship with specific means explained in embodiments described later.

BRIEF DESCRIPTION OF DRAWINGS

FIG. 3 shows cross sectional views each showing a condition in an M/C 13 that accords with a depression state of a brake pedal 11.

FIG. 11 is a diagram showing relationships between a pedal reaction force etc. and an increase in the stroke amount of the brake pedal 11 in accordance with the suction of the brake fluid from the inside of the M/C 13 in the case of the raising and in the case of the no raising.

FIG. 12 is a diagram showing relationships between the stroke amount of the brake pedal 11 and a raising amount or an amount of differential pressure to be generated by first and second differential pressure control valves 16 and 36.

FIG. 13 shows cross sectional views each showing a condition in the M/C 13 that accords with a depression state of the brake pedal 11.

DESCRIPTION OF EMBODIMENTS

Figure 1:
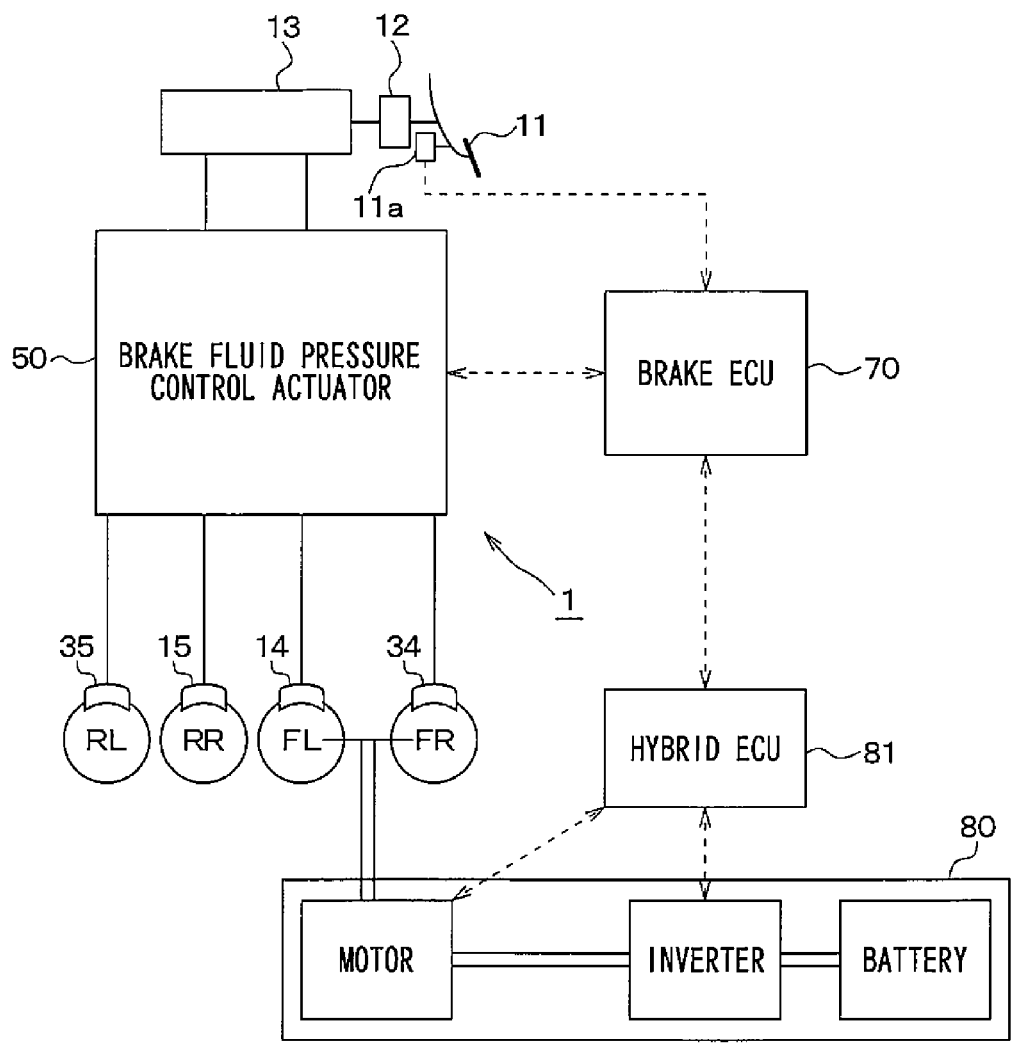
FIG. 1 is a diagram showing a block configuration of each of functions of a hybrid vehicle in which is installed a vehicle braking control device 1 to which a first embodiment of the present invention is applied.

Hereinafter, embodiments of the present invention will be explained with reference to the drawings. Note that, in the drawings, same reference numerals are assigned to parts that are the same as or equivalent to each other in each of the embodiments below.

First Embodiment

Hereinafter, a first embodiment of the present invention will be explained. FIG. 1 is a diagram showing a block configuration of each of functions of a hybrid vehicle in which is installed a vehicle braking control device 1 to which the first embodiment of the present invention is applied.

Figure 2:
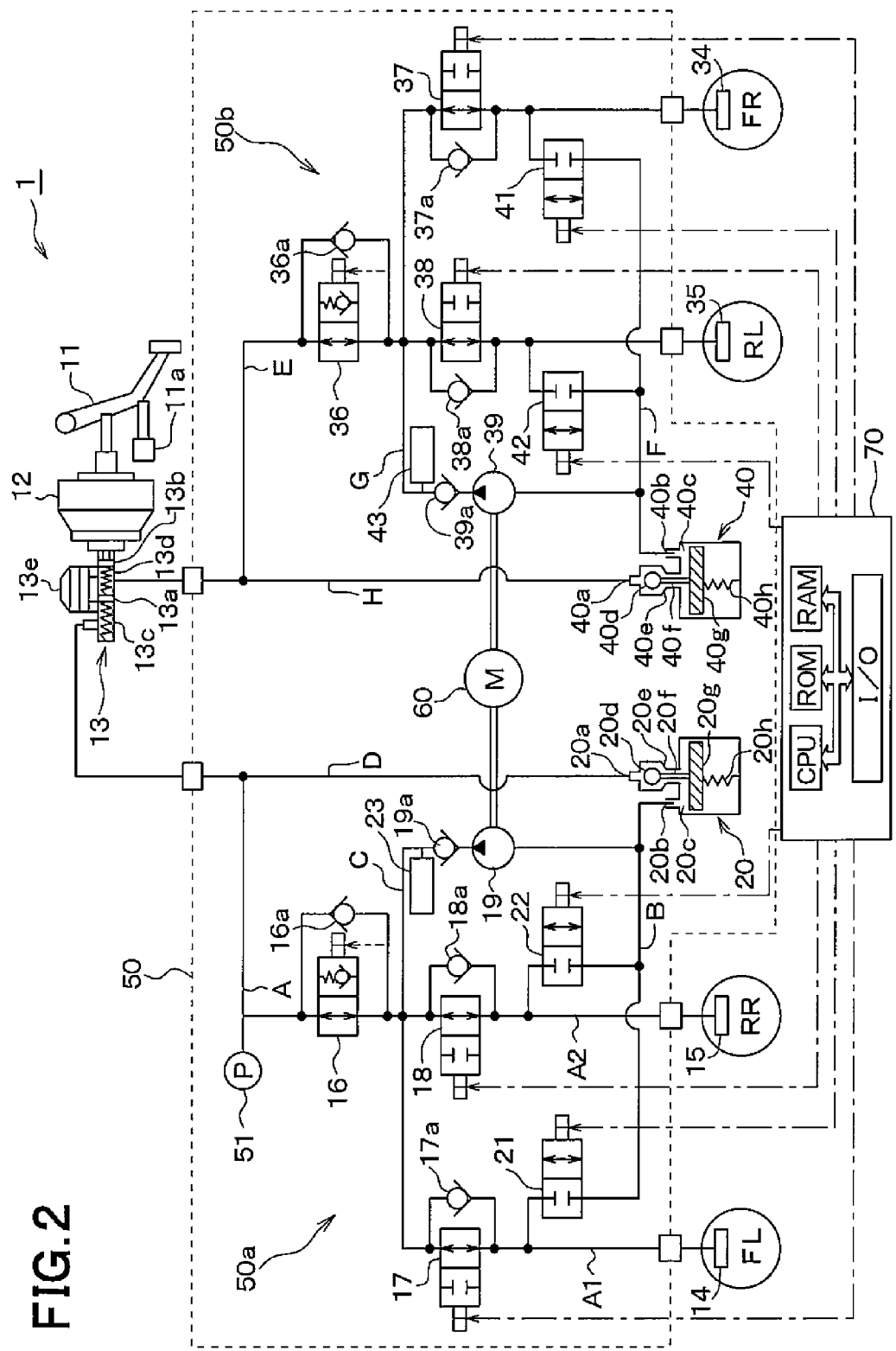
FIG. 2 is a diagram showing a detailed configuration of each of portions that form a hydraulic brake device.

First, a hydraulic brake device in the vehicle braking control device 1 according to the present embodiment will be explained. As shown in FIG. 1, the vehicle braking control device 1 is provided with a brake pedal 11, a booster 12, an M/C 13, W/Cs 14, 15, 34 and 35 and a brake fluid pressure control actuator 50, and the hydraulic brake device is formed by these parts. Further, the vehicle braking control device 1 is provided with a brake ECU 70. The brake ECU 70 functions as a part of control means for performing cooperative control of the hydraulic brake device and a regenerative brake device, which will be described later, and a hydraulic braking force that is generated by the hydraulic brake device and a regenerative braking force that is generated by the regenerative brake device are thus controlled. FIG. 2 is a diagram showing a detailed configuration of each of portions that form the hydraulic brake device.

As shown in FIG. 2, a stroke sensor 11a is connected to the brake pedal 11, which is a brake operating member that is depressed by a driver. A detection signal of the stroke sensor 11a is transmitted to the bake ECU 70 and thus a depression amount of the brake pedal 11 can be detected. Further, the brake pedal 11 is connected to the booster 12 and the M/C 13 that function as a brake fluid pressure generating source. When the driver depresses the brake pedal 11, the pedal depression force is boosted by the booster 12 and pushes master pistons 13a and 13b that are disposed in the M/C 13. As a result, the same M/C pressure is generated in a primary chamber 13c and a secondary chamber 13d that are divided from each other by the master pistons 13a and 13b.

The M/C 13 is provided with a master reservoir 13e that has passages that respectively connect with the primary chamber 13c and the secondary chamber 13d. The master reservoir 13e supplies brake fluid to the M/C 13 via the passages, or stores excessive brake fluid inside the M/C 13. The M/C pressure generated in the M/C 13 is transmitted to each of the W/Cs 14, 15, 34 and 35 via the brake fluid pressure control actuator 50.

The brake fluid pressure control actuator 50 is formed having a first piping system 50a and a second piping system 50b. The first piping system 50a controls a brake fluid pressure applied to a front left wheel FL and a rear right wheel RR, and the second piping system 50b controls a brake fluid pressure applied to a rear left wheel RL and a front right wheel FR. Front-rear piping is formed by the two piping systems, namely, the first and second piping systems 50a and 50b.

Hereinafter, the first piping system 50a and the second piping system 50b will be explained. Since the first piping system 50a and the second piping system 50b have substantially the same configuration, the first piping system 50a will be explained here, and the first piping system 50a will be referred to for the second piping system 50b.

The first piping system 50a is provided with a conduit A, which is a main conduit that transmits the above-described M/C pressure to the W/C 14 provided on the front left wheel FL and to the W/C 15 provided on the rear right wheel RR. The W/C pressure is generated in each of the W/Cs 14 and 15 through the conduit A.

The conduit A is provided with a first differential pressure control valve 16 that includes a relief valve that can perform control to a communicatively connected state or a differential pressure state. The first differential pressure control valve 16 is brought into a communicatively connected state in a normal braking state. When an electric current flows to a solenoid, it is brought into a differential pressure state. The differential pressure formed by the first differential pressure control valve 16 varies in accordance with an electric current value of the electric current that is caused to flow to the solenoid, and the larger the electric current value, the larger the amount of differential pressure. When the first differential pressure control valve 16 is in a differential pressure state, the flow of the brake fluid is restricted such that the W/C pressure is higher than the M/C pressure by the amount of differential pressure.

The conduit A branches into two conduits A1 and A2 downstream of the first differential pressure control valve 16 toward the W/Cs 14 and 15. One of the two conduits A1 and A2 is provided with a first pressure increase control valve 17 that controls increase of the brake fluid pressure to the W/C 14, and the other is provided with a second pressure increase control valve 18 that controls increase of the brake fluid pressure to the W/C 15.

The first and second pressure increase control valves 17 and 18 are configured as electromagnetic valves, which are two-position valves that can control a communicatively connected/disconnected state. When the first and second pressure increase control valves 17 and 18 are controlled to the communicatively connected state, the M/C pressure or the brake fluid pressure by discharge of the brake fluid from a pump 19, which will be described later, is applied to the W/Cs 14 and 15.

During normal braking by the driver operating the brake pedal 11, the first differential pressure control valve 16 and the first and second pressure increase control valves 17 and 18 are constantly controlled to the communicatively connected state. Further, the first differential pressure control valve 16 and the first and second pressure increase control valves 17 and 18 are respectively provided with safety valves 16a, 17a and 18a, in parallel.

A first pressure reduction control valve 21 and a second pressure reduction control valve 22 configured as electromagnetic valves, which are two-position valves that can control the communicatively connected/disconnected state, are respectively disposed in a conduit B, which is a pressure reduction conduit that connects a pressure regulating reservoir 20 and points in the conduit A between the first and second pressure increase control valves 17 and 18 and each of the W/Cs 14 and 15. The first and second pressure reduction control valves 21 and 22 are constantly in the disconnected state during normal braking.

A conduit C, which is a recirculation conduit, is disposed such that it connects the pressure regulating reservoir 20 with the conduit A that is the main conduit. The self suction type pump 19 that is driven by a motor 60 is provided in the conduit C such that it can suck brake fluid from the pressure regulating reservoir 20 and discharge the brake fluid to the M/C 13 side or to the side of the W/Cs 14 and 15. On a discharge port side of the pump 19, a safety valve 19a is provided to inhibit high-pressure brake fluid from being applied to the pump 19, and a fixed capacity damper 23 is also provided to reduce pulsation of the brake fluid discharged by the pump 19.

A conduit D, which is an auxiliary conduit, is provided such that it connects the pressure regulating reservoir 20 and the M/C 13. Through the conduit D, the pump 19 sucks the brake fluid from the M/C 13 and discharges it to the conduit A. Thus, when TCS control, ABS control or the like is performed, the brake fluid can be supplied to the side of the W/Cs 14 and 15, and it is possible to increase the W/C pressure of a corresponding wheel.

The pressure regulating reservoir 20 includes a reservoir opening 20a, which is connected to the conduit D and through which the brake fluid is received from the M/C 13 side, and a reservoir opening 20b, which is connected to the conduit B and the conduit C and through which the brake fluid that has escaped from the W/Cs 14 and 15 is received and through which the brake fluid is supplied to a suction side of the pump 19. The reservoir openings 20a and 20b are communicatively connected to a reservoir chamber 20c. A ball valve 20d is provided further to the inside than the reservoir opening 20a. A rod 20f, which has a predetermined stroke to move the ball valve 20d up and down, is provided on the ball valve 20d, separately to the ball valve 20d. Moreover, a piston 20g and a spring 20h are provided in the reservoir chamber 20c. The piston 20g moves in conjunction with the rod 20f. The spring 20h presses the piston 20g to the ball valve 20d side, thus generating a force that pushes the brake fluid out of the reservoir chamber 20c.

In the pressure regulating reservoir 20 configured in this manner, when a predetermined amount of brake fluid is stored, the ball valve 20d is seated on a valve seat 20e so that the brake fluid does not flow into the pressure regulating reservoir 20. Therefore, an amount of brake fluid that exceeds the suction capability of the pump 19 does not flow into the reservoir chamber 20c, and thus a high pressure is not applied to the suction side of the pump 19.

Further, the brake fluid pressure control actuator 50 is provided with an M/C pressure sensor 51. The M/C pressure sensor 51 is provided in a section of a brake line that has the same pressure as the M/C pressure. In the case of the present embodiment, it is provided in the conduit A between the M/C 13 and the first differential pressure control valve 16. A detection signal of the M/C pressure sensor 51 is transmitted to the brake ECU 70.

Meanwhile, the second piping system 50b has substantially the same configuration as that of the first piping system 50a, as described above. More specifically, the first differential pressure control valve 16 and the safety valve 16a correspond to a second differential pressure control valve 36 and a safety valve 36a. The first and second pressure increase control valves 17 and 18 and the safety valves 17a and 18a respectively correspond to third and fourth pressure increase control valves 37 and 38 and safety valves 37a and 38a, and the first and second pressure reduction control valves 21 and 22 respectively correspond to third and fourth pressure reduction control valves 41 and 42. The pressure regulating reservoir 20 and the respective structural elements 20a to 20h correspond to a pressure regulating reservoir 40 and respective structural elements 40a to 40h. The pump 19 and the safety valve 19a correspond to a pump 39 and a safety valve 39a. The damper 23 corresponds to a damper 43. Further, the conduit A, the conduit B, the conduit C and the conduit D respectively correspond to a conduit E, a conduit F, a conduit G and a conduit H. The hydraulic piping structure in the vehicle braking control device 1 is formed as described above.

The brake ECU 70 is formed by a known microcomputer including a CPU, a ROM, a RAM, an I/O and the like, and performs processing, such as various types of calculation, in accordance with programs stored in the ROM and the like. For example, the brake ECU 70 calculates, as a brake operation amount, a stroke amount of the brake pedal 11 and an M/C pressure based on the detection signal of the stroke sensor 11a and the detection signal of the M/C pressure sensor 51. Further, based on these, the brake ECU 70 calculates a target braking force that corresponds to the brake operation amount, and outputs an electrical signal to the brake fluid pressure control actuator 50 in order to perform pump pressurization. The electrical signal from the brake ECU 70 is used as a basis for controlling the voltage applied to the respective control valves 16 to 18, 21, 22, 36 to 38, 41, 42 and the motor 60 that drives the pumps 19 and 39. Thus, the W/C pressure to be generated in each of the W/Cs 14, 15, 34 and 35 is controlled.

Specifically, in the brake fluid pressure control actuator 50, when an electric current is supplied from the brake ECU 70 to the motor 60 and to a control valve driving solenoid, each of the control valves 16 to 18, 21, 22, 36 to 38, 41 and 42 is driven in accordance with the electric current supply and a brake line route is set. Then, a brake fluid pressure in accordance with the set brake line route is generated in each of the W/Cs 14, 15, 34 and 35, and the braking force to be generated for each of the wheels is controlled.

For example, when the hydraulic braking force is generated by performing pressurization such that the W/C pressure in the W/Cs 14 and 34 of the front wheels FL and FR is higher than the M/C pressure, the motor 60 is driven in a state in which the first differential control valve 16 and the second differential control valve 36 are in a differential pressure state, and the pumps 19 and 39 are caused to perform suction/discharge operations of the brake fluid. As a result of this, the brake fluid in the M/C 13 is sucked out by the pump 39 through the conduits H and G and is supplied to the W/C 34 of the front wheel FR through the conduits G and E. In a similar manner, the brake fluid in the M/C 13 is sucked out by the pump 19 through the conduits D and C and is supplied to the W/C 14 of the front wheel FL through the conduits C and A. At this time, a differential pressure is generated between the M/C 13 and the W/Cs 14 and 34 by pressure regulating valves in the first differential pressure control valve 16 and the second differential pressure control valve 36. As a result, the W/Cs 14 and 34 are pressurized such that the W/C pressure is higher than the M/C pressure, and the hydraulic braking force is generated.

Further, as shown in FIG. 1, the hybrid vehicle is provided with a regenerative brake device 80 and a hybrid ECU 81 that performs regenerative brake control by controlling the regenerative brake device 80.

The regenerative brake device 80 is configured such that it includes a motor that is connected to an axle that connects both the front wheels FL and FR, an inverter that is electrically connected to the motor, and a battery that is electrically connected to the inverter. The motor is an AC synchronous type motor, for example, and the electric power supply to the motor is performed by the inverter converting DC electricity generated by the battery into AC electricity. The inverter fulfills a role of converting the DC electricity of the battery into AC electricity based on a control signal from the hybrid ECU 81, and a role of converting the AC electricity generated by the motor into DC electricity and charging the battery.

The hybrid ECU 81 mainly controls a drive train. The hybrid ECU 81 supplies data that is used in regenerative brake control to the brake ECU 70, or conversely, receives necessary data from the brake ECU 70.

Then, the hybrid ECU 81 performs regenerative brake control etc. in cooperation with the brake ECU 70, and controls actuation of the motor by controlling the inverter. More specifically, the actuation of the motor is controlled by the inverter based on the control signal from the hybrid ECU 81, electric power generation is performed by driving the motor using the rotational force of the two front wheels FL and FR (or the axle that connects them), and the battery is charged by the obtained electric power. Further, since a braking force is generated by a resistance force of the motor during the electric power generation, the braking force is used as a regenerative braking force.

At this time, the hybrid ECU 81 handles various types of information of the regenerative brake device 80, and transmits necessary information to the brake ECU 70 in accordance with a request from the brake ECU 70. Here, the various types of information handled by the hybrid ECU 81 are information about a possible regenerative braking force amount, a possible regenerative braking force gradient, a regeneration execution braking force and the like. The possible regenerative braking force amount means a maximum value of the regenerative braking force that can be generated by the regenerative brake device 80. The possible regenerative braking force gradient means a gradient of the regenerative braking force that can be generated by the regenerative brake device 80 in a present control period. The regeneration execution braking force is a regenerative braking force that is actually generated by the regenerative brake device 80. The possible regenerative braking force and the possible regenerative braking force gradient are values that are determined based on the capability of the regenerative brake device 80. From the possible regenerative braking force amount and the possible regenerative braking force gradient, the hybrid ECU 80 calculates a regenerative braking force that can be actually requested. Then, the regenerative braking force is generated based on the regenerative braking force that can be requested, and the actually generated regeneration execution braking force is calculated and transmitted to the brake ECU 70. For example, the regeneration execution braking force is calculated in the following manner. That is, since a regeneration execution torque corresponding to the regenerative braking force can be calculated from a counter electromotive force generated by the motor, the counter electromotive force of the motor is calculated by a known technique and the regeneration execution torque corresponding to the regenerative braking force is calculated from the counter electromotive force. The regeneration execution braking force is calculated using the regeneration execution torque, or by further converting the regeneration execution torque into a braking force.

Next, an actuation of the vehicle braking control device 1 configured as described above will be explained. First, a reason why the actuation is performed will be explained before explaining a specific actuation of the vehicle braking control device 1.

When control is started, in order to generate the target braking force corresponding to the stroke amount of the brake pedal 11 that is detected based on the detection signal of the stroke sensor 11a, a hydraulic braking force is generated by the hydraulic brake device. At the same time, a regenerative braking force is generated by the regenerative brake device 80. Cooperative control of the hydraulic brake device and the regenerative brake device 80 is performed so that a total braking force of the hydraulic braking force and the regenerative braking force becomes equal to the target braking force.

At this time, in the hydraulic brake device, even when the brake pedal 11 is depressed, an ineffective stroke in which the M/C pressure is not generated exists until the brake pedal 11 is depressed by a predetermined amount or more. Therefore, at the same time that the brake pedal 11 is depressed, the pumps 19 and 39 are driven and the first and second differential pressure control valves 16 and 36 are brought into a differential pressure state, thereby starting pump pressurization.

FIG. 3 shows cross sectional views each showing a condition in the M/C 13 that accords with a depression state of the brake pedal 11. Note that, here, although the M/C 13 is configured by the primary chamber 13c only, in order to simplify the drawing, the same operation as that in the primary chamber 13c is also performed in the secondary chamber 13d.

As shown in FIG. 3(a), in an initial period of the depression of the brake pedal 11, specifically, a period until a port 13f of the master piston 13a reaches a cup seal 13g, the primary chamber 13c and the master reservoir 13e are communicatively connected to each other. Therefore, even if the brake pedal 11 is depressed, an ineffective stroke occurs in which the M/C pressure does not increase. At this time, the brake fluid in the M/C 13 is sucked out by the pumps 19 and 39 and is supplied toward the W/Cs 14, 15, 34 and 35. By doing this, it is possible to increase the W/C pressure even during the ineffective stroke. At this time, the primary chamber 13c and the master reservoir 13e are communicatively connected to each other. Therefore, even if the brake fluid in the M/C 13 is sucked out, the brake fluid is supplied from the master reservoir 13e and the M/C pressure is in a 0 state.

Further, in order to increase the W/C pressure, the first and second differential pressure control valves 16 and 36 are brought into a differential pressure state. However, since the M/C pressure is in the 0 state, the differential pressure becomes equal to the W/C pressure. For that reason, the amount of differential pressure of the first and second differential pressure control valves 16 and 36 is set by subtracting the regenerative braking force that is generated by the regenerative brake device 80 from the target braking force so that the braking force to be generated as the hydraulic braking force is generated, and an amount of electric current corresponding to the amount of differential pressure is supplied to the first and second differential pressure control valves 16 and 36.

Then, once the brake pedal 11 is depressed by an amount corresponding to the ineffective stroke, thereafter the M/C pressure is generated in accordance with the depression of the brake pedal 11. More specifically, as shown in FIG. 3(b), when the brake pedal 11 is depressed by an amount corresponding to the ineffective stroke, the port 13f of the master piston 13a reaches the cup seal 13g, and the master reservoir 13e and the primary chamber 13c are disconnected. For that reason, after that, if the brake pedal 11 is depressed, the brake fluid is supplied only from the inside of the M/C 13 to the side of the pumps 19 and 39 as shown in FIG. 3(c), and the M/C pressure is generated in accordance with the depression of the brake pedal 11.

Figure 4:
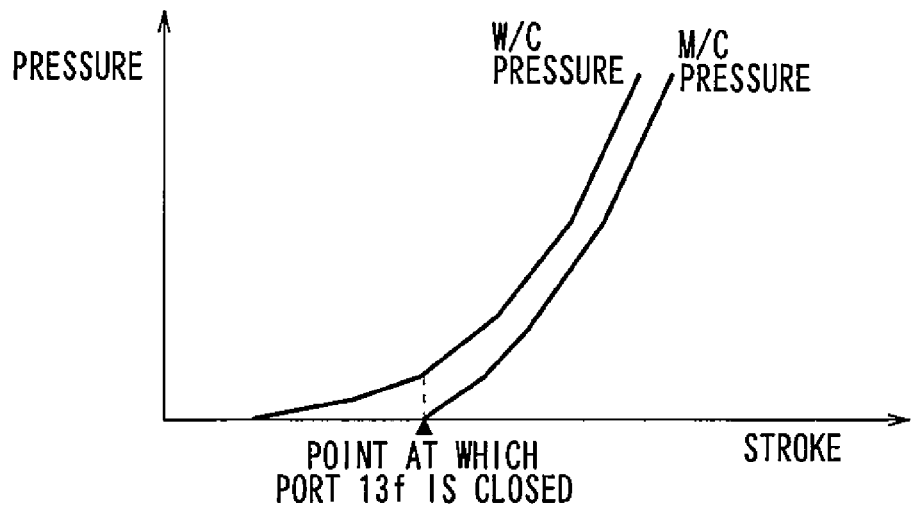
FIG. 4 is a diagram showing relationships between a stroke amount of the brake pedal 11 and an M/C pressure and a W/C pressure in a case of related art.

Therefore, in the related art, the amount of differential pressure of the first and second differential pressure control valves 16 and 36 is held at the value at that time, and the W/C pressure is increased by an increased amount of the M/C pressure that corresponds to the depression of the brake pedal 11. Therefore, in the case of the related art, relationships between the stroke amount of the brake pedal 11 and the M/C pressure and the W/C pressure are relationships such as those shown in FIG. 4. More specifically, the relationships are such that, although the W/C pressure is generated before the generation of the M/C pressure, the M/C pressure is also generated from a point at which the port 13f is closed and the W/C pressure also increases in accordance with an increase in the M/C pressure.

However, in this manner, if the amount of differential pressure of the first and second differential pressure control valves 16 and 36 is held at the same time at which the brake pedal 11 is depressed by an amount corresponding to the ineffective stroke, the hydraulic braking force equal to or greater than that is generated based on the M/C pressure and a state is achieved in which a relatively large M/C pressure is generated. Therefore, after that, when a situation occurs in which the pressurization amount by pump pressurization is significantly increased, such as when, for example, switching from regenerative braking force to hydraulic braking force is performed and the switching is realized by pump pressurization, the brake fluid in the M/C 13 is sucked out.

At this time, the amount of suction of the brake pedal 11 to the M/C 13 side due to the suction of the brake fluid from the inside of the M/C 13, or the amount of reduction in the pedal reaction force resulting from the decrease in the M/C pressure by the suction of the brake fluid varies depending on the magnitude of the M/C pressure that is being generated at that time.

Figure 5:
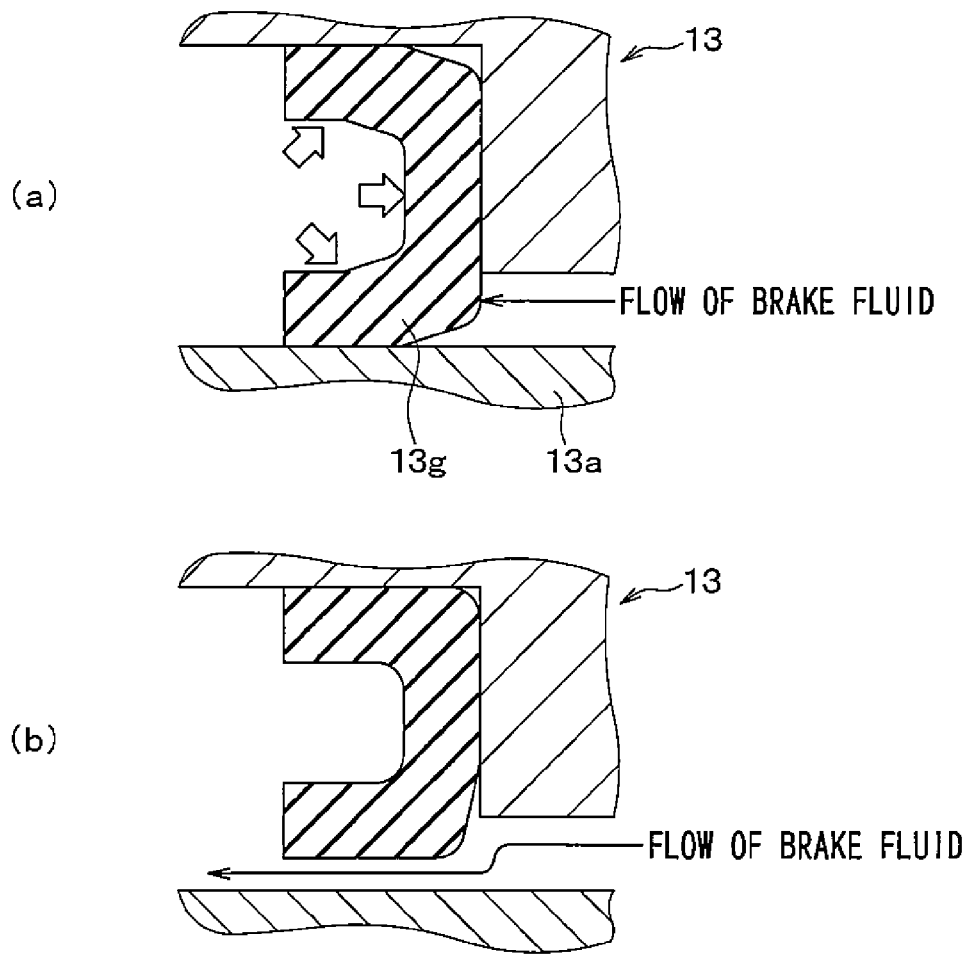
FIG. 5 shows cross sectional views showing conditions of a cup seal 13g when the M/C pressure is being generated and when the M/C pressure is a negative pressure due to the suction of brake fluid.

Specifically, the amount of the suction of the brake pedal 11 to the M/C 13 side is determined by the amount of the brake fluid sucked out until the pressure of the inside of the M/C 13 reaches 0. The reason for this will be explained with reference to FIG. 5. FIG. 5 shows cross sectional views showing conditions of the cup seal 13g when the M/C pressure is being generated and when the M/C pressure is a negative pressure due to the suction of the brake fluid.

As shown in FIG. 5(a), when the M/C pressure is being generated, the M/C pressure is applied to the cup seal 13g and therefore, sealing is performed by the cup seal 13g during this period, and the brake fluid is not supplied from the master reservoir 13e to the inside of the M/C 13. For that reason, the brake fluid in the M/C 13 is sucked out until the M/C pressure reaches 0. However, as shown in FIG. 5(b), when the M/C pressure is a negative pressure, sealing cannot be performed by the cup seal 13g and the brake fluid is supplied from the master reservoir 13e. For that reason, once the M/C pressure reaches 0, thereafter the brake fluid of the master reservoir 13e is sucked out, and the suction of the brake fluid that reduces the volume in the M/C 13 is not performed. Therefore, the amount of the suction of the brake pedal 11 to the M/C 13 side is determined by the amount of the brake fluid sucked out until the pressure of the inside of the M/C 13 reaches 0.

The amount of reduction in the pedal reaction force resulting from the decrease in the M/C pressure by the suction of the brake fluid also varies depending on the magnitude of the M/C pressure that is being generated at that time. This is because, when the M/C pressure reaches 0 as described above, although a slight negative pressure is generated, the M/C pressure does not decrease more than that.

Therefore, when a situation occurs in which the pressurization amount by pump pressurization is significantly increased and the suction of the brake fluid from the inside of the M/C 13 is started, the amount of the suction of the brake pedal 11 to the M/C 13 side is increased as the M/C pressure that is being generated at that time is increased, and the amount of reduction in the pedal reaction force resulting from the decrease in the M/C pressure is also increased. In order to improve this, it is sufficient to reduce the M/C pressure that is being generated when the suction of the brake fluid is started.

Figure 6:
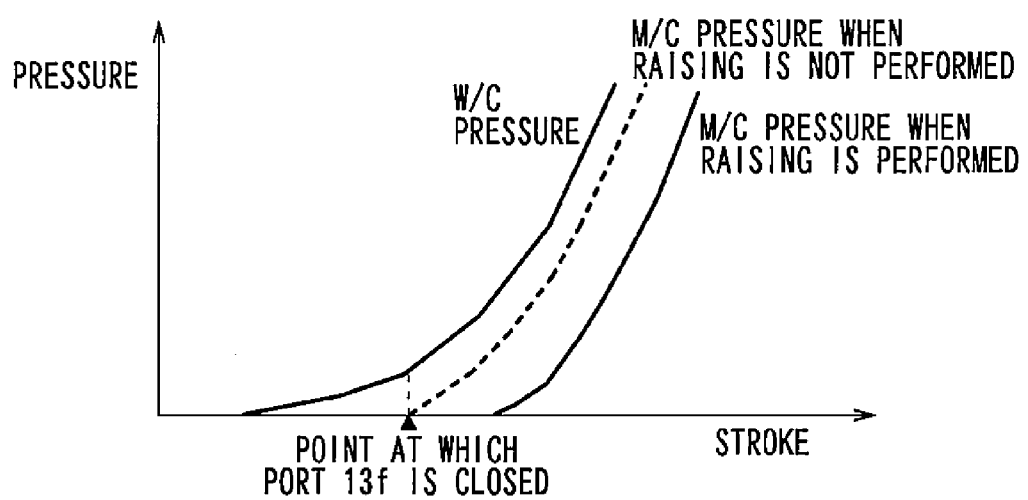
FIG. 6 is a diagram showing relationships between a stroke amount of the brake pedal 11 and an M/C pressure and a W/C pressure when the W/C pressure is raised.

For that reason, in the present embodiment, the amount of differential pressure of the first and second differential pressure control valves 16 and 36 is not held after the depression of the brake pedal 11 has reached the amount corresponding to the ineffective stroke, and even after that, the amount of differential pressure of the first and second differential pressure control valves 16 and 36 is increased in accordance with the depression of the brake pedal 11, and the W/C pressure is raised by pump pressurization. By doing this, it is possible to reduce the M/C pressure corresponding to the raising by pump pressurization. Thus, it is possible to reduce the amount of the suction of the brake pedal 11 to the M/C 13 side, and it is also possible to reduce the amount of reduction in the pedal reaction force resulting from the decrease in the M/C pressure. When the W/C pressure is raised in this manner, relationships between the stroke amount of the brake pedal 11 and the M/C pressure and the W/C pressure are relationships such as those shown in FIG. 6. More specifically, the relationships are such that the M/C pressure is generated before the generation of the M/C pressure, and the M/C pressure is held at 0 even after exceeding the point at which the port 13f is closed, and such that the M/C pressure is generated when the stroke is generated by the amount corresponding to the raising, and thereafter the W/C pressure also increases in accordance with an increase in the M/C pressure.

Figure 7:
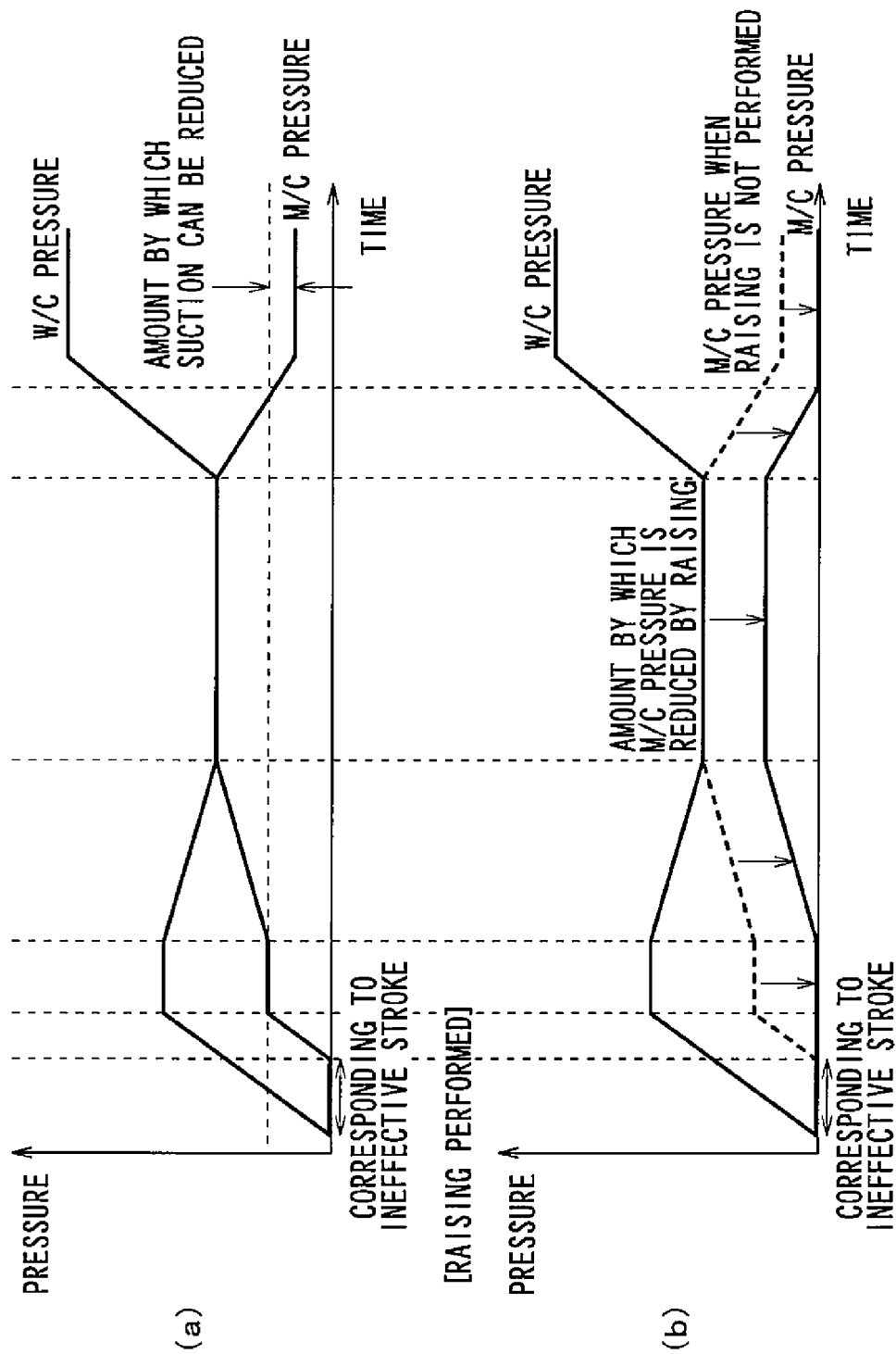
FIG. 7 shows timing charts showing an example when the W/C pressure is not raised by pump pressurization and an example when the W/C pressure is raised.

FIG. 7 shows timing charts showing an example when the W/C pressure is not raised by this type of pump pressurization and an example when the W/C pressure is raised. As shown in FIG. 7(a), when the W/C pressure is not raised, the amount of differential pressure of the first and second differential pressure control valves 16 and 36 is held at the same time at which the depression of the brake pedal 11 reaches the amount corresponding to the ineffective stroke. Thus, after that, the M/C pressure is generated. For that reason, a relatively large M/C pressure is generated in accordance with depression of the brake pedal 11. Therefore, after that, if a situation occurs in which the pressurization amount by pump pressurization is significantly increased and the suction of the brake fluid from the inside of the M/C 13 is started, the amount of the suction of the brake pedal 11 to the M/C 13 side is increased and the amount of reduction in the pedal reaction force resulting from the decrease in the M/C pressure is also increased.

In contrast to this, as shown in FIG. 7(b), when the W/C pressure is raised, the amount of differential pressure of the first and second differential pressure control valves 16 and 36 is increased even after the depression of the brake pedal 11 reaches the amount corresponding to the ineffective stroke. Therefore, only a relatively small M/C pressure is generated. Therefore, after that, if a situation occurs in which the pressurization amount by pump pressurization is significantly increased and the suction of the brake fluid from the inside of the M/C 13 is started, it is possible to reduce the amount of the suction of the brake pedal 11 to the M/C 13 side and the amount of reduction in the pedal reaction force resulting from the decrease in the M/C pressure also decreases.

Therefore, in the present embodiment, control is performed such that the amount of differential pressure of the first and second differential pressure control valves 16 and 36 is not held after the depression of the brake pedal 11 has reached the amount corresponding to the ineffective stroke, and even after that, the amount of differential pressure of the first and second differential pressure control valves 16 and 36 is increased in accordance with depression of the brake pedal 11, and the W/C pressure is raised by pump pressurization.

Figure 8:
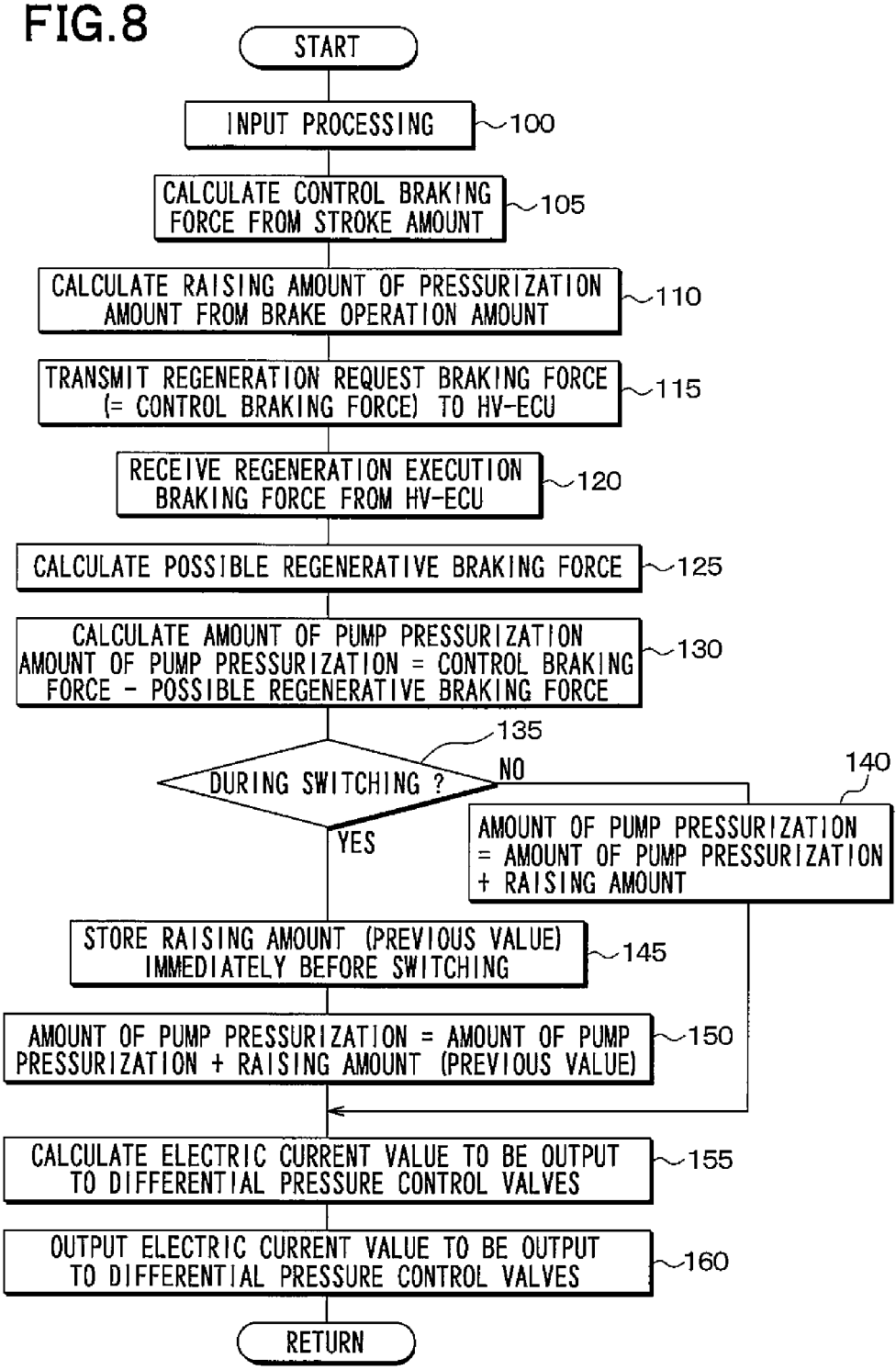
FIG. 8 is a flowchart showing, in detail, braking control processing that is performed by the vehicle braking control device 1.

Next, actuation of the vehicle braking control device 1 when the W/C pressure is raised in the manner described above will be explained. FIG. 8 is a flowchart showing, in detail, braking control processing that is performed by the vehicle braking control device 1. The processing shown in this drawing is performed by the brake ECU 70 for each predetermined control cycle.

First, at step 100, input processing is performed. Specifically, a detection signal of the stroke sensor 11a or a detection signal of the M/C pressure sensor 51 is input, and the stroke amount of the brake pedal 11 or the M/C pressure is calculated as a brake operation amount.

Next, at step 105, using the stroke amount of the brake pedal 11 calculated at step 100 as the brake operation amount, a control braking force is calculated based on the brake operation amount. Specifically, after the target braking force is calculated based on the stroke amount, the control braking force is calculated by subtracting the M/C pressure from the target braking force.

The target braking force is a value that is determined corresponding to the brake operation amount such that the larger the brake operation amount, the larger the target braking force, and generally it can be obtained by a function expression or a map that represent a relationship between the brake operation amount and the target braking force. Here, a value obtained by subtracting an ineffective stroke that is determined for each vehicle from the calculated stroke amount is used as the brake operation amount, and the target braking force is calculated from the brake operation amount. Further, the control braking force is a value obtained by subtracting the M/C pressure from the target braking force, namely, a braking force corresponding to the hydraulic braking force by pump pressurization and to the regenerative braking force by the regenerative brake device 80, which is a braking force, of the target braking force, to be generated by other than the M/C pressure.

Then at step 110, a raising amount of the pressurization amount is calculated from the brake operation amount. In the present embodiment, corresponding to a stroke excluding the ineffective stroke from the stroke amount of the brake pedal 11, namely, corresponding to an effective stroke, the raising amount is calculated as a value that increases as the effective stroke increases. Specifically, when the raising is not performed as in the related art, the M/C pressure is generated corresponding to the stroke amount of the brake pedal 11. Further, the raising amount is calculated such that the relationship of the M/C pressure with respect to the stroke amount is equal to the relationship of the raising amount with respect to the stroke amount.

After that, the processing proceeds to step 115 and a regeneration request braking force is transmitted to the hybrid ECU 81. Here, it is desirable for the regenerative brake device 80 to generate a regenerative braking force that is as large as possible. Therefore, the control braking force is transmitted to the hybrid ECU 81 as the regeneration request braking force. Further, at step 120, information transmitted from the hybrid ECU 81, specifically, information relating to the regeneration execution braking force generated by the regenerative brake device 80, is received. Based on this, the possible regenerative braking force is calculated at step 125. More specifically, this is the regenerative braking force by which the regeneration execution braking force is actually generated at that time, and this is used as the possible regenerative braking force.

Next, at step 130, an amount of pump pressurization is calculated. The amount of pump pressurization is a hydraulic braking force to be generated by pump pressurization, and is a value obtained by subtracting the possible regenerative braking force from the control braking force. The control braking force is a braking force corresponding to the hydraulic braking force by pump pressurization and to the regenerative braking force by the regenerative brake device 80, namely, a braking force, of the target braking force, to be generated by other than the M/C pressure. Therefore, the hydraulic braking force by pump pressurization (=the amount of pump pressurization) is obtained by subtracting, from the control braking force, the possible regenerative braking force that is generated by the regenerative brake device 80.

After that, the processing proceeds to step 135 and it is determined whether or not switching from the regenerative braking force to the hydraulic braking force is being performed. The switching is performed when it is determined that the switching is started, for example, in switching start determination that is performed by the brake ECU 70. The switching from the regenerative braking force to the hydraulic braking force is performed, for example, by reducing the regeneration request braking force that is transmitted from the brake ECU 70 to the hybrid ECU 80. During execution of the switching, it is determined that the switching is being performed. For example, in order to switch all the regenerative braking force to the hydraulic braking force when the vehicle speed is a determined vehicle speed before the vehicle is stopped, a switching start timing is set to a certain time before that time, and it is determined that the switching is started when the timing is reached. Alternatively, a timing at which a certain vehicle speed is reached may be used as the switching start timing and it may be determined that the switching is started. Further, the amount of switching from the regenerative braking force to the hydraulic braking force can be adjusted, as appropriate, depending on a control mode of the switching, and may be set such that switching is performed equally within a switching time period, or may be changed within the switching time period.

When a negative determination is made at step 135, the processing proceeds to step 140 and a total amount of pump pressurization is calculated. In this case, the total amount of pump pressurization is a value obtained by adding the raising amount calculated at step 110 to the amount of pump pressurization calculated at step 130.

When an affirmative determination is made at step 135, the processing proceeds to step 145 and a previous value of the raising amount is stored. The previous value of the raising amount used herein means a raising amount immediately before the switching. Since the raising amount is calculated at step 110 described above, the previous value of the raising amount calculated in the previous control cycle is stored when it is determined at step 135 that the switching is being performed. After that, the processing proceeds to step 150 and the total amount of pump pressurization is calculated here also. In this case, the total amount of pump pressurization is a value obtained by adding the previous raising amount stored at step 115 to the amount of pump pressurization calculated at step 140.

In this manner, the total amount of pump pressurization when the switching is being performed and the total amount of pump pressurization when the switching is not being performed are calculated at steps 140 and 150. Note that the total amount of pump pressurization is a value obtained by adding the raising amount (or the previous value thereof) to the amount of pump pressurization (=the control braking force=the possible regenerative braking force) calculated at step 130. A value obtained by adding the M/C pressure to this value is a total braking pressure that is contributed to generation of the hydraulic braking force. Therefore, seemingly, it appears as if the total braking force that is generated for the vehicle by the hydraulic braking force and by the regenerative braking force is larger when the raising is performed, in comparison to when the raising is not performed. More specifically, when the raising is not performed, the total braking force=the M/C pressure+the control braking force, and when the raising is performed, the total braking force=the M/C pressure+the control braking force+the raising amount. However, at the time of the raising, the M/C pressure becomes 0 and the raising amount matches the M/C pressure generated when the raising is not performed. Therefore, there is no change in the total braking force.

Then, the processing proceeds to step 155, and an electric current value to be output to the first and second differential pressure control valves 16 and 36 is calculated. This electric current value is a value corresponding to the total amount of pump pressurization that is generated by the amount of differential pressure of the first and second differential pressure control valves 16 and 36, and is calculated based on the results calculated at steps 140 and 150. After that, at step 160, the electric current of the electric current value calculated at step 155 is output to the first and second differential pressure control valves 16 and 36, thereby causing the first and second differential pressure control valves 16 and 36 to generate a predetermined amount of differential pressure in order to generate the total amount of pump pressurization.

In this manner, the hydraulic braking force is generated by pump pressurization, and at the same time, the regenerative braking force is generated by the regenerative brake device 80 based on the transmission of the regeneration request braking force at step 125 described above. As a result of this, it is possible to generate the target braking force.

Figure 9:
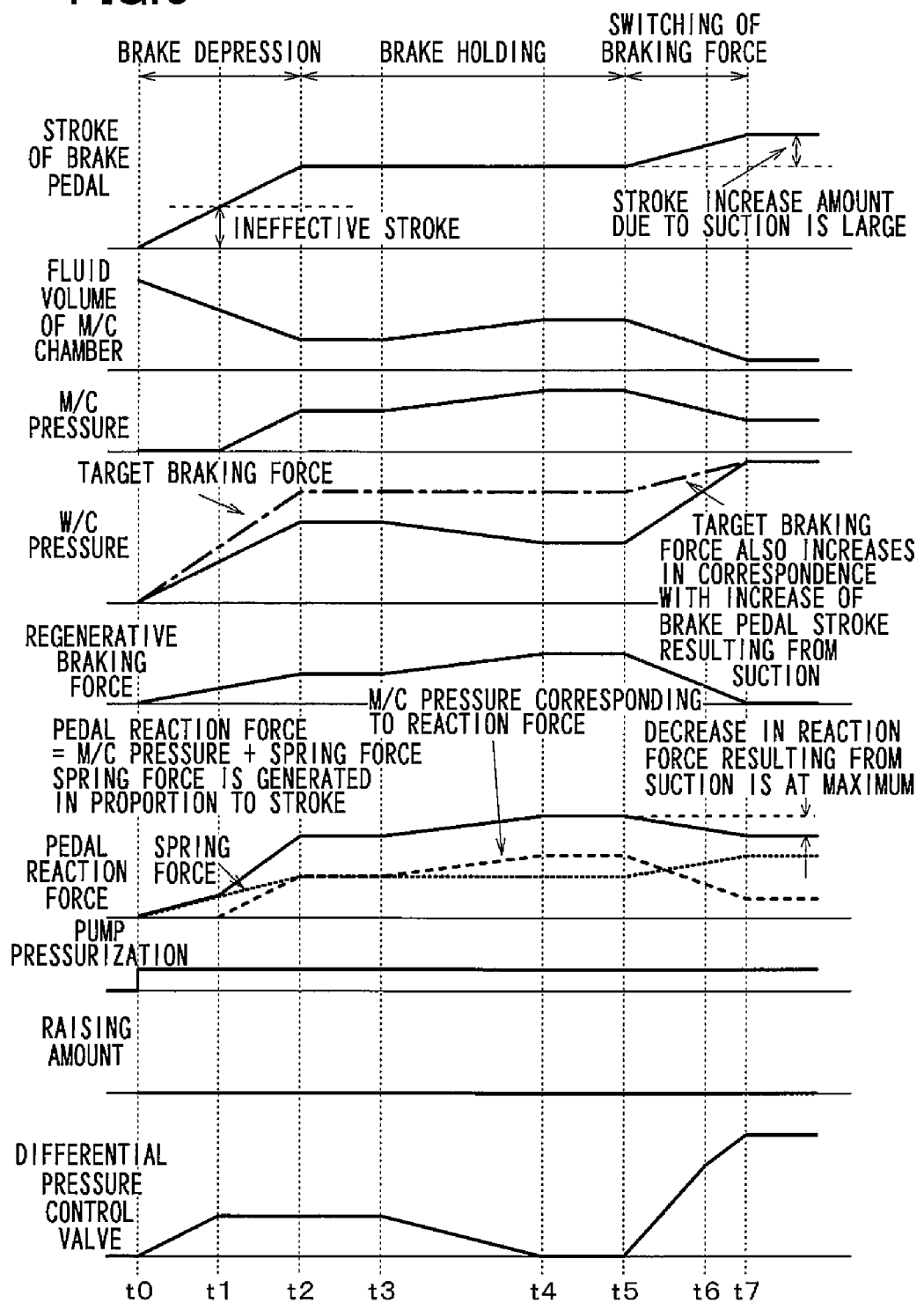
FIG. 9 is a timing chart when the raising is not performed.

Next, effects obtained when the W/C pressure is raised by pump pressurization as described above will be explained in comparison to when the raising is not performed. FIG. 9 is a timing chart when the raising is not performed and FIG. 10 is a timing chart when the raising is performed.

Figure 10:
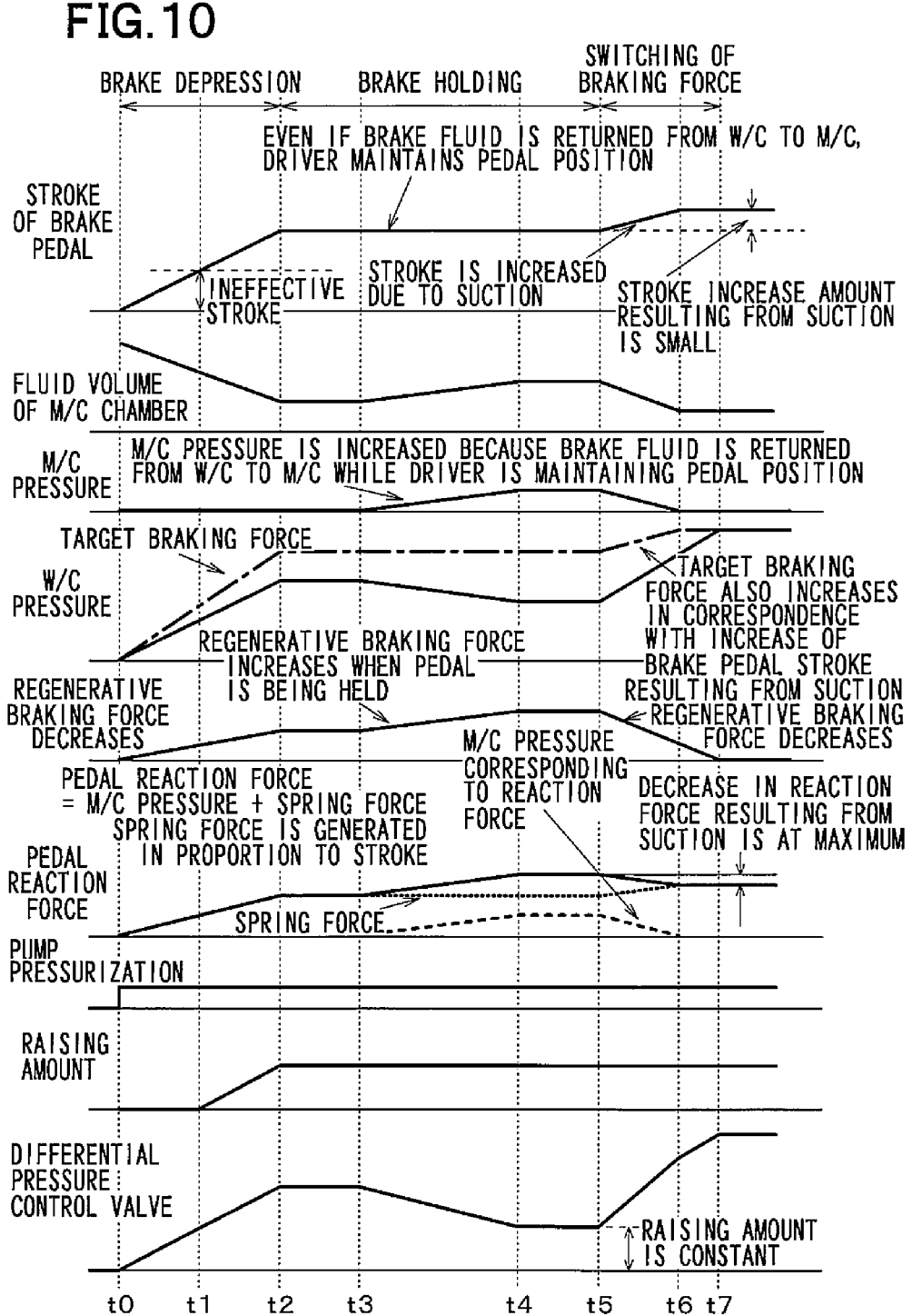
FIG. 10 is a timing chart when the raising is performed.

FIG. 9 and FIG. 10 show conditions when brake holding is performed such that the brake pedal 11 is held at a predetermined position after brake depression has been performed at a time point t0, and thereafter, the switching of the braking force from the regenerative braking force to the hydraulic braking force is performed.

As shown in FIG. 9 and FIG. 10, even if the brake depression is performed at the time point t0, an ineffective stroke occurs in which the M/C pressure is not generated until the brake pedal 11 is depressed by a predetermined amount or more. At this time, the pumps 19 and 39 are actuated, and at the same time, the first and second differential pressure control valves 16 and 36 are actuated. Thus, the hydraulic braking force is generated by pump pressurization, and at the same time, the regenerative braking force is generated by transmitting the regeneration request braking force to the regenerative brake device 80. Further, although the M/C pressure is not generated, the master pistons 13a and 13b are moved corresponding to the depression of the brake pedal 11. Therefore, the amount of the brake fluid in the M/C 13 is reduced. The pedal reaction force is equal to a sum of the M/C pressure and a spring force in the M/C 13. However, since the M/C pressure is still 0, the spring force is equal to the pedal reaction force.

Then, if the brake pedal 11 is depressed by an amount corresponding to the ineffective stroke at a time point t1, when the raising is not performed, as in the related art, the increase in the amount of differential pressure generated by the first and second differential pressure control valves 16 and 36 is stopped, as shown in FIG. 9. Therefore, after that, the M/C pressure is generated in accordance with the depression of the brake pedal 11, and thus, the target braking force is generated by the hydraulic braking force that is based on the amount of pump pressurization and the M/C pressure, and by the regenerative braking force generated by the regenerative brake device 80. Therefore, a relatively high M/C pressure is generated. Further, since the pedal reaction force is the sum of the M/C pressure and the spring force in the M/C 13, a relatively large pedal reaction force is generated by the generation of the relatively high M/C pressure.

In contrast to this, when the raising is performed, as in the present embodiment, the increase in the amount of differential pressure generated by the first and second differential pressure control valves 16 and 36 is continued, as shown in FIG. 10. Therefore, the target braking force is generated by the hydraulic braking force based on the amount of pump pressurization and by the regenerative braking force generated by the regenerative brake device 80. Therefore, the M/C pressure becomes equal to 0 (or a relatively low M/C pressure). Further, since the pedal reaction force is the sum of the M/C pressure and the spring force in the M/C 13, only a relatively small pedal reaction force is generated as the M/C pressure is 0.

After that, at a time point t2, when the raising is not performed, the M/C pressure is also held constant and the amount of the brake fluid in the M/C 13 is also held constant. Also when the raising is performed, the amount of the brake fluid in the M/C 13 is held constant. Further, as shown by a time point t3 to a time point t4, if the regenerative braking force is increased when the brake pedal 11 is being held, the amount of differential pressure of the first and second differential pressure control valves 16 and 36 is reduced in accordance with the increase of the regenerative braking force, and the hydraulic braking force that is based on the amount of pump pressurization is reduced. Note that, at this time, the brake fluid is returned from the W/Cs 14, 15, 34 and 35 to the M/C 13. Therefore, the M/C pressure is increased and the pedal reaction force is also increased by an amount corresponding to the increase in the M/C pressure.

Then, when the switching of the braking force from the regenerative braking force to the hydraulic braking force is performed at a time point t5, the amount of differential pressure of the first and second differential pressure control valves 16 and 36 is increased in accordance with the decrease of the regenerative braking force, and the switching from the regenerative braking force to the hydraulic braking force is performed. Specifically, the brake fluid in the M/C 13 is sucked out again and pump pressurization is performed, and thus the braking force is switched. At this time, as described above, until the M/C pressure reaches 0, only the brake fluid in the M/C 13 is sucked out and the brake fluid is not supplied from the master reservoir 13e.

For that reason, when the raising is not performed, as in the related art, a relatively large M/C pressure is generated. Therefore, the brake fluid is also sucked out from a time point t6 to a time point t7 shown in FIG. 9, and a large amount of brake fluid is sucked out. The suction of the brake pedal 11 also increases correspondingly. In addition, since the relatively large M/C pressure is reduced to 0, the change in the pedal reaction force also corresponds to the variation in the M/C pressure. For that reason, the brake pedal 11 is sucked to the M/C 13 side by the suction of the brake fluid from the M/C 13, or the decrease in the pedal reaction force due to the decrease in the M/C pressure is greater, resulting in deterioration in a brake feeling.

However, when the raising is performed, as in the present embodiment, the M/C pressure is relatively small. Therefore, the suction of the brake fluid is not performed from the time point t6 to the time point t7 shown in FIG. 10. Thus, the amount of the brake fluid to be sucked out is reduced, and the suction of the brake pedal 11 is also reduced. In addition, since the change in the M/C pressure is only a decrease from a relatively small M/C pressure to 0, the change in the pedal reduction force is also reduced. For that reason, it is possible to suppress the deterioration in the brake feeling resulting from the suction of the brake fluid from the M/C 13.

Further, when the braking force is switched from the regenerative braking force to the hydraulic braking force, although the amount of differential pressure to be generated by the first and second differential pressure control valves 16 and 36 is increased, the raising amount is held constant. If, for example, the raising amount is increased in accordance with the stroke amount of the brake pedal 11, the amount of the brake fluid in the M/C 13 decreases earlier and a speed at which the brake pedal 11 is sucked in becomes higher. Therefore, the raising amount is held constant so that the speed at which the brake pedal 11 is sucked in is inhibited from becoming higher. Thus, it is possible to further suppress the deterioration in the brake feeling.

As explained above, in the braking control device of the present embodiment, when the depression of the brake pedal 11 reaches an amount corresponding to the ineffective stroke, the amount of differential pressure of the first and second differential pressure control valves 16 and 36 is not held. Even after that, the amount of differential pressure of the first and second differential pressure control valves 16 and 36 is increased in accordance with the depression of the brake pedal 11, and the W/C pressure is raised by pump pressurization. By doing this, it is possible to reduce the M/C pressure by an amount corresponding to the raising by pump pressurization. It is thus possible to reduce the amount by which the brake pedal 11 is sucked to the M/C 13 side, and it is also possible to reduce the amount of the decrease in the pedal reaction force resulting from the decrease in the M/C pressure.

Note that FIG. 11 shows relationships between the pedal reaction force etc. and the increase in the stroke amount of the brake pedal 11 in accordance with the suction of the brake fluid from the inside of the M/C 13 when the raising is not performed, as in the related art, and when the raising is performed, as in the present embodiment.

More specifically, when the raising is not performed, as in the related art, as shown in FIG. 11(a), a large amount of brake fluid is sucked out until the M/C pressure reaches 0, and thus, the increase in the stroke of the brake pedal 11 due to the suction also becomes larger. However, a decrease (ΔFP) in the M/C pressure is larger than an increase (ΔFS) in the spring force of the M/C 13 resulting from the stroke increase. Therefore, the pedal reaction force, which is represented as the sum of the M/C pressure and the spring force, decreases by an amount corresponding to the stroke increase.

However, when the raising is performed, as in the present embodiment, as shown in FIG. 11(b), the brake fluid that is sucked out until the M/C pressure reaches 0 is small, and thus, the stroke increase of the brake pedal 11 due to the suction is small. Therefore, since the decrease in the M/C pressure is larger than the increase in the spring force of the M/C 13 resulting from the stroke increase, even if the pedal reaction force that is represented as the sum of the M/C pressure and the spring force decreases, the amount of the stroke increase is small. Thus, the decrease in the pedal reaction force also becomes smaller.

Second Embodiment

A second embodiment of the present invention will be explained. In the present embodiment, the raising method of the first embodiment is changed. Other points are the same as those of the first embodiment, and only a part that is different from the first embodiment will be explained.

In the above-described first embodiment, the raising amount is increased as the stroke becomes larger in accordance with the stroke amount of the brake pedal 11. In contrast to this, a stroke threshold value may be set, and the raising amount may be increased as the stroke becomes larger, until the stroke exceeds the stroke threshold value. When the stroke exceeds the stroke threshold value, the raising amount may be set to a constant reference raising amount. In this manner, since an upper limit value of the raising amount is set to be the constant reference raising amount, it is possible to obtain a similar effect to that of the first embodiment. In addition, it is possible to inhibit an excessively large raising amount from being set. In this case, when the M/C pressure is generated by the depression of the brake pedal 11, the hydraulic braking force that corresponds to the M/C pressure is also generated. It is thus possible to generate a target braking force in the same manner as in the first embodiment.

Third Embodiment

A third embodiment of the present invention will be explained. In the present embodiment, the raising method of the second embodiment is changed. Other points are the same as those of the first and second embodiments, and only a part that is different from the first and second embodiments will be explained.

In the above-described first and second embodiments, the raising is performed after the stroke amount of the brake pedal 11 reaches the ineffective stroke, regardless of a stroke speed of the brake pedal 11. In contrast to this, the start timing of the raising may be changed in accordance with the stroke speed of the brake pedal 11.

FIG. 12 is a diagram showing relationships between the stroke amount of the brake pedal 11 and the raising amount or the amount of differential pressure to be generated by the first and second differential pressure control valves 16 and 36. As shown by solid lines in FIG. 12, in the above-described first and second embodiments, the raising is performed after the stroke amount of the brake pedal 11 has reached the ineffective stroke. In contrast to this, in the present embodiment, as shown by dotted lines in FIG. 12, the start timing of the raising is made earlier as a change rate (a change rate in a stroke-increasing direction) of the stroke of the brake pedal 11 becomes larger. Specifically, when the change rate of the stroke of the brake pedal 11 is larger than a stroke speed threshold value, the start timing of the raising is advanced so that the raising is started during the ineffective stroke. Therefore, when the stroke threshold value is set as in the second embodiment, the stroke amount when the stroke threshold value is reached is set to be smaller as the start timing of the raising is made earlier. This reason will be explained with reference to FIG. 13.

FIG. 13 shows cross sectional views each showing a condition in the M/C 13 that accords with a depression state of the brake pedal 11. Note that, here, the M/C 13 is formed only by the primary chamber 13c in order to simplify the drawing. However, the same operation as that in the primary chamber 13c is performed also in the secondary chamber 13d.

As shown in FIG. 13(a), in an initial period of the depression of the brake pedal 11, specifically, until the port 13f of the master piston 13a reaches the cup seal 13g, the primary chamber 13c and the master reservoir 13e are communicatively connected to each other. Further, the amount of the brake fluid to be sucked out from the inside of the M/C 13 by the pumps 19 and 39 is set to be equal to or more than the amount of the brake fluid in the M/C 13 that corresponds to the stroke of the brake pedal 11. At this time, a lacking amount of brake fluid to be sucked out by the pumps 19 and 39 is supplied from the master reservoir 13e. In this state, even if the brake pedal 11 is depressed, the M/C pressure does not increase. If, for example, the amount of the brake fluid to be sucked out from the inside of the M/C 13 by the pumps 19 and 39 is less than the amount of the brake fluid in the M/C 13 that corresponds to the stroke of the brake pedal 11, excessive brake fluid returns to the master reservoir 13e. Therefore, the M/C pressure becomes 0.

Then, as shown in FIG. 13(b), the raising is also performed when the brake pedal 11 is depressed by an amount corresponding to the ineffective stroke and the port 13f of the of the piston 13a reaches the cup seal 13g, and the amount of the brake fluid to be sucked out from the inside of the M/C 13 by the pumps 19 and 39 is set to be equal to or more than the amount of the brake fluid in the M/C 13 that corresponds to the stroke of the brake pedal 11. For that reason, even after the ineffective stroke, the M/C pressure can be 0 during the raising.

However, as shown in FIG. 13(c), if the brake pedal 11 is depressed quickly, the opening area of the port 13f becomes narrow immediately before the port 13f reaches the cup seal 13g, and the flow of the brake fluid from the inside of the M/C 13 to the master reservoir 13e is hindered by an orifice effect. Therefore, the M/C pressure starts to increase if the amount of suction during the ineffective stroke is set such that the amount of the brake fluid in the M/C 13 corresponding to the stroke of the brake pedal 11 is larger than the amount of the brake fluid to be sucked out from the inside of the M/C 13 by the pumps 19 and 39.

For that reason, when the change rate of the stroke of the brake pedal 11 is larger than the stroke speed threshold value, the start timing of the raising is advanced so that the raising is started during the ineffective stroke. By doing this, it is possible to perform the raising before the M/C pressure is generated by the aforementioned orifice effect, and it is thus possible to prevent the M/C pressure from increasing.

Other Embodiments

In the above-described embodiments, the vehicle braking control device that performs cooperative control of the hydraulic brake device and the regenerative brake device 80 is explained. However, the present invention can be applied to a vehicle braking control device that performs brake control such that the brake fluid is sucked out from the inside of the M/C 13 and pump pressurization is performed so that the W/C pressure becomes higher than the M/C pressure.

Further, in the above-described embodiments, the brake pedal 11 is explained as an example of the brake operating member. However, another brake operating member, such as a brake lever, for example, may be used. Further, although in the above-described embodiments, the regenerative braking force is applied only to the front right wheel FR and the front left wheel FL, the regenerative braking force may be applied to the rear wheels or all the wheels, or the vehicle need not necessarily generate a regenerative braking force. Further, the present embodiment uses, as a brake line form, an X brake line structure in which the front right wheel FR and the rear left wheel RL belong to the same system and the front left wheel FL and the rear right wheel RR belong to the same system. However, a front-rear brake line structure may be used in which the front right wheel FR and the front left wheel FL belong to the same system and the rear right wheel RR and the rear left wheel RL belong to the same system.

REFERENCE SIGNS LIST

1 . . . Vehicle braking control device
11 . . . Brake pedal
11a . . . Stroke sensor
12 . . . Booster
13 . . . M/C
14, 15, 34, 35 . . . W/C
16, 36 . . . Differential pressure control valve
19, 39 . . . Pump
50 . . . Brake fluid pressure control actuator
51 . . . M/C pressure sensor
60 . . . Motor
70 . . . Brake ECU
80 . . . Regenerative brake device
81 . . . Hybrid ECU

The invention claimed is:

1. A vehicle braking control device that generates a target braking force corresponding to an operation amount of a brake operating member, comprising:
a master cylinder that generates a master cylinder pressure based on an operation of the brake operating member by a driver;
a wheel cylinder to which a wheel cylinder pressure that is based on the master cylinder pressure is applied and which thereby generates a hydraulic braking force for a wheel;
brake fluid pressure increasing means that increases the wheel cylinder pressure such that the wheel cylinder pressure is higher than the master cylinder pressure, the brake fluid pressure increasing means including: a differential pressure control valve that forms a differential pressure between the master cylinder pressure and the wheel cylinder pressure; a pump that sucks out brake fluid in the master cylinder in a state in which the differential pressure is provided by the differential pressure control valve, and increases the wheel cylinder pressure by discharging the brake fluid toward the wheel cylinder, and a motor that drives the pump; and
control means that instructs the differential pressure that the differential pressure control valve forms, wherein taking a stroke within a period from when the operation of the brake operating member is started to when a predetermined stroke operation is performed as an ineffective stroke in which the master cylinder pressure is not generated,
the control means controls an amount of differential pressure formed by the differential control valve by controlling the differential pressure control valve such that a hydraulic braking force that corresponds to a stroke of the brake operating member is generated during the ineffective stroke, and even after the stroke of the brake operating member exceeds the ineffective stroke, increases the wheel cylinder pressure by performing raising of the amount of differential pressure formed by the differential pressure control valve by a predetermined raising amount with respect to the amount of differential pressure during the ineffective stroke, said predetermined raising amount being greater than zero,
the control means uses a regenerative brake device that performs electric power generation based on a rotational force of the wheel and generates a regenerative braking force by applying a resistance force that is based on electric power generation to the wheel, and
the control means performs cooperative control of the hydraulic brake device and the regenerative brake device such that a total braking force of the hydraulic braking force and the regenerative braking force is equal to a target braking force that corresponds to the stroke of the brake operating member.

2. The vehicle braking control device according to claim 1, wherein
during a period in which the stroke of the brake operating member is smaller than a prescribed stroke threshold value after the stroke of the brake operating member has exceeded the ineffective stroke, the control means increases the raising amount as the stroke of the brake operating member becomes larger, and after the stroke of the brake operating member has exceeded the stroke threshold value, the control means sets the raising amount to a constant reference raising amount.

3. The vehicle braking control device according to claim 2, wherein
when the stroke of the brake operating member is increased, the larger a change rate of the stroke becomes, the earlier the control means starts the raising of the amount of differential pressure formed by the differential pressure control valve.

4. The vehicle braking control device according to claim 3, wherein
when the stroke of the brake operating member is increased, if the change rate of the stroke is larger than a predetermined stroke speed threshold value, the raising is started while in the ineffective stroke.

5. The vehicle braking control device according to claim 4, wherein
when, during braking, the regenerative braking force generated by the regenerative brake device is switched to the hydraulic braking force generated by the hydraulic brake device, the control means holds the raising amount to the value that is set before the regenerative braking force is switched to the hydraulic braking force.

6. The vehicle braking control device according to claim 3, wherein
when, during braking, the regenerative braking force generated by the regenerative brake device is switched to the hydraulic braking force generated by the hydraulic brake device, the control means holds the raising amount to the value that is set before the regenerative braking force is switched to the hydraulic braking force.

7. The vehicle braking control device according to claim 2, wherein when, during braking, the regenerative braking force generated by the regenerative brake device is switched to the hydraulic braking force generated by the hydraulic brake device, the control means holds the raising amount to the value that is set before the regenerative braking force is switched to the hydraulic braking force.

8. The vehicle braking control device according to claim 1, wherein when, during braking, the regenerative braking force generated by the regenerative brake device is switched to the hydraulic braking force generated by the hydraulic brake device, the control means holds the raising amount to the value that is set before the regenerative braking force is switched to the hydraulic braking force.

* * * * *